United States Patent
Sinha et al.

(10) Patent No.: US 8,041,125 B2
(45) Date of Patent: Oct. 18, 2011

(54) DATA VISUALIZATION DEVICE AND METHOD

(75) Inventors: Vibha S. Sinha, New Delhi (IN);
Bikram Sengupta, New Delhi (IN);
Satish Chandra, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 12/061,739

(22) Filed: Apr. 3, 2008

(65) Prior Publication Data
US 2008/0256442 A1    Oct. 16, 2008

Related U.S. Application Data

(63) Continuation of application No. 11/614,336, filed on Dec. 21, 2006, now abandoned.

(51) Int. Cl.
*G06K 9/62* (2006.01)
(52) U.S. Cl. .................................. 382/225; 715/273
(58) Field of Classification Search .................. 382/225
See application file for complete search history.

(56) References Cited

U.S. PATENT DOCUMENTS
2007/0185904 A1* 8/2007 Matsuzawa et al. ....... 707/104.1

OTHER PUBLICATIONS

Dynamic Aggregation with Circular Visual Designs (Source: http://www.cs.cmu.edu/~sage/Papers/solarPlot-InfoViz98.doc) 1998.
Topological Fisheye Views for Visualizing Large Graphs (Source: http://www.research.att.com/areas/visualization/papers_videos/papers/2004gkn_1.pdf) Dec. 21, 2006.
Interactive Hierarchical Displays: A General Framework for Visualization and Exploration of Large Multivariate Data Sets, Jing Yang (Dept. of Comput. Sci., Worcester Polytech. Inst., MA, USA); Ward, M.O.; Rundensteiner, E.A., (Source: *Computers & Graphics*, v 27, n 2, Apr. 2003, p. 265-283, ISSN: 0097-8793, CODEN: COGRD2).
Sinha et al., U.S. Appl. No. 11/614,336, IN920060028US1, Office Action Communication, Feb. 8, 2010, 13 pages.
Sinha et al., U.S. Appl. No. 11/614,336, IN920060028US1, Office Action Communication, Jun. 28, 2010, 6 pages.

* cited by examiner

*Primary Examiner* — Samir Ahmed
*Assistant Examiner* — Ruiping Li
(74) *Attorney, Agent, or Firm* — Gibb I.P. Law Firm, LLC; Derek S. Jennings

(57) ABSTRACT

A data visualization device comprises a focal attribute calculator for calculating a focal value of each of a plurality of data input items, and for categorizing each of the plurality of data input items as either non-cluster blobs or second blobs. The device further comprises a clustering attribute calculator for clustering data input items categorized as second blobs into one or more cluster blobs, and a visualization shaper for arranging the one or more cluster blobs and the non-cluster blobs, relative to each other in accordance with the focal values of the data input items of respective blobs.

9 Claims, 21 Drawing Sheets

SOCIAL PROXY

FISHEYE VIEWS

DATA VISUALIZATION DEVICE AND METHOD

CROSS-REFERENCE TO RELATED APPLICATIONS

This application is a continuation of U.S. application Ser. No. 11/614,336 filed Dec. 21, 2006, the complete disclosure of which, in its entirety, is herein incorporated by reference.

FIELD OF THE INVENTION

This invention relates generally to the visualization of data, and in particular, to the visualization of large datasets especially as peripheral awareness views.

BACKGROUND

Browsing information from large datasets can be a challenging exercise that becomes difficult when multiple datasets and/or changing datasets are involved. There is often a need to keep track of multiple datasets of information containing dynamic content. Such dynamic content may for example include data-points whose attributes change constantly in response to inputs from other users, or data-points which are being newly created. It becomes increasingly difficult for users to manually keep track of such large information spaces, whether dynamic or static.

FIGS. 1A and 1B show two known visualizations for providing users with greater awareness of information, using the concept of peripheral awareness. The visualization 100 of FIG. 1A utilizes a side bar 102 placed on a user's workspace. The side bar 102 displays information that is updated automatically. The visualization 104 of FIG. 1B uses a combination of a list view and a tree view to summarize information related to all data points in a user's workspace. The list and tree view provides a linearization of a multidimensional dataset. Data is aggregated under heading sub-views, which can be minimized and maximized.

Other visualizations 200, 202, 204, 206, such as those shown by FIGS. 2A-2D, offer either one or more of the following visual functionalities: an overview of the entire workspace, a peripheral view of the workspace, re-aggregation of data in the visualization, multiple regions of interest, an ability to compare between data points based on certain attributes, and aggregate versus focused vision in the same view.

The publication by Jing Yang et al., "Interactive hierarchical displays: a general framework for visualization and exploration of large multivariate datasets", Computer & Graphics, V27, N2, April 2003, pages 265-283, describes a framework for visualizing large multivariate datasets. The underlying principle of this framework is to develop a multi-resolution view of the data via hierarchical clustering, and to use hierarchical variations of traditional multivariate visualization techniques to convey aggregation information about the resulting clusters. Users can then explore their desired focus region at different levels of detail, using our suite of navigation and filtering tools The publication by Gansner et al., "Topological fish eye view for visualizing large graphs" (http://www.research att.com/areas/visualization/papers_videos/papers/ 2004gkn_1.pdf) describes visualization to effectively layout dense graphs. Gansner et al. propose a topological zooming method. Which pre-computes a hierarchy of coarsened graphs that are combined on-the-fly into renderings, with the level of detail dependent on distance from one or more foci. A related geometric distortion method yields constant information density displays from these renderings There is a need, however, to allow users to keep track of relevant information even when their attention is not focused on the data-space of the relevant information (i.e. peripheral view of whole workspace), and/or allow users to maintain an awareness of the entire data-space though the users may be focusing with greater attention on a particular set of data-points.

There is further a need for providing visualization of information in a manner so as to allow comparison of the information based on attributes and values of such information, or of functions thereof.

SUMMARY

According to a first aspect of this invention, there is provided a device for generating a visualization of a plurality of data input items, comprising focal attribute calculator for calculating a focal value of each of the plurality of data input items and for categorizing each of the plurality of data input items as non-cluster blobs or second blobs, a clustering attribute calculator for clustering data input items categorized as second blobs into one or more cluster blobs, and a visualization shaper for arranging the one or more cluster blobs and the non-cluster blobs relative to each other in accordance with the focal values of the data input items of the respective blobs.

According to a further aspect of this invention, there is provided a method for generating a data visualization of a plurality of data input items, the method comprising the steps of calculating a focal value of each of the plurality of data input items, categorizing the plurality of data input items as non-cluster blobs or second blobs, clustering the data input items categorized as second blobs into one or more cluster blobs, and arranging the non-cluster blobs, and the cluster blobs, relative to each other in accordance with the focal values of the data input items of the respective blobs.

According to a further aspect of this invention, there is provided a computer program product having a computer readable medium having a computer program recorded therein for generating a data visualization of a plurality of data input items, the computer program product comprising computer program code means for calculating a focal value of each of the plurality of data input items, computer program code means for categorizing the plurality of data input items inputs into non-cluster blobs or second blobs, for clustering the data input items categorized as second blobs into one or more cluster blobs, and for arranging the non-cluster blob types, and the cluster blobs, relative to each other in accordance with the focal values of the data input items of the respective blobs According to a further aspect of this invention, there is provided a computer readable medium having recorded therein a program operable to instruct a computer to perform, on a plurality of data input items, the steps of for calculating a focal value of each of the plurality of data input items, categorizing the plurality of data input items into non-cluster blobs or second blobs, clustering the data input items categorized as second blobs into one or more cluster blobs, and arranging the non-cluster blob types, and the cluster blobs, relative to each other in accordance with the focal values of the data input items of the respective blobs.

BRIEF DESCRIPTION OF THE DRAWINGS

Some aspects of the prior art and one or more aspects of this invention will now be described with reference to the drawings and appendices, in which.

DETAILED DESCRIPTION

Overview

According to aspects of this invention, visualizations are generated to enable users to keep track of large amounts of information in a dataset with greater ease and flexibility.

The aspects adopt a logical fish-eye approach in which multiple focal regions may be defined in a visualization, and each focal region contains focused information regarding individual data points of interest. In regions other than the focal regions, data points are clustered together based on selectable attributes to provide an aggregate view of the data. Such regions are referred to as non-focal regions.

Data points are graphically represented as blobs. Each blob may represent a single data point or a cluster of data points, depending on whether they lie within the focal or the non focal region. The information represented by each blob on the visualization correlates to a value of the corresponding data point (in the case of single dimensional data) or to values of one or more attributes of the data point and/or functions thereof (in the case of multivariate data).

Focal values, which are data points, attributes of data points, or functions of attributes of data points, are calculated for each data point of the dataset, and are used to determine the rendering of those data points in the visualization. The focal values are predominantly selected to be data points, attributes of data points, or functions of attributes of data points, which a user is particularly interested in studying.

A first aspect of this invention is described with reference to FIGS. 3 and 4. The aspect will be in part hereinafter described with reference to its application to a Concurrent Versions System (CVS) as an example of a data-repository, however, it is to be appreciated that neither this nor any other aspect of this invention is limited to such an application. All aspects of this invention are readily envisioned as being applicable in any scenario in which assimilation of information can be facilitated and improved through visualization of the information.

Visualization

Figure 1A:
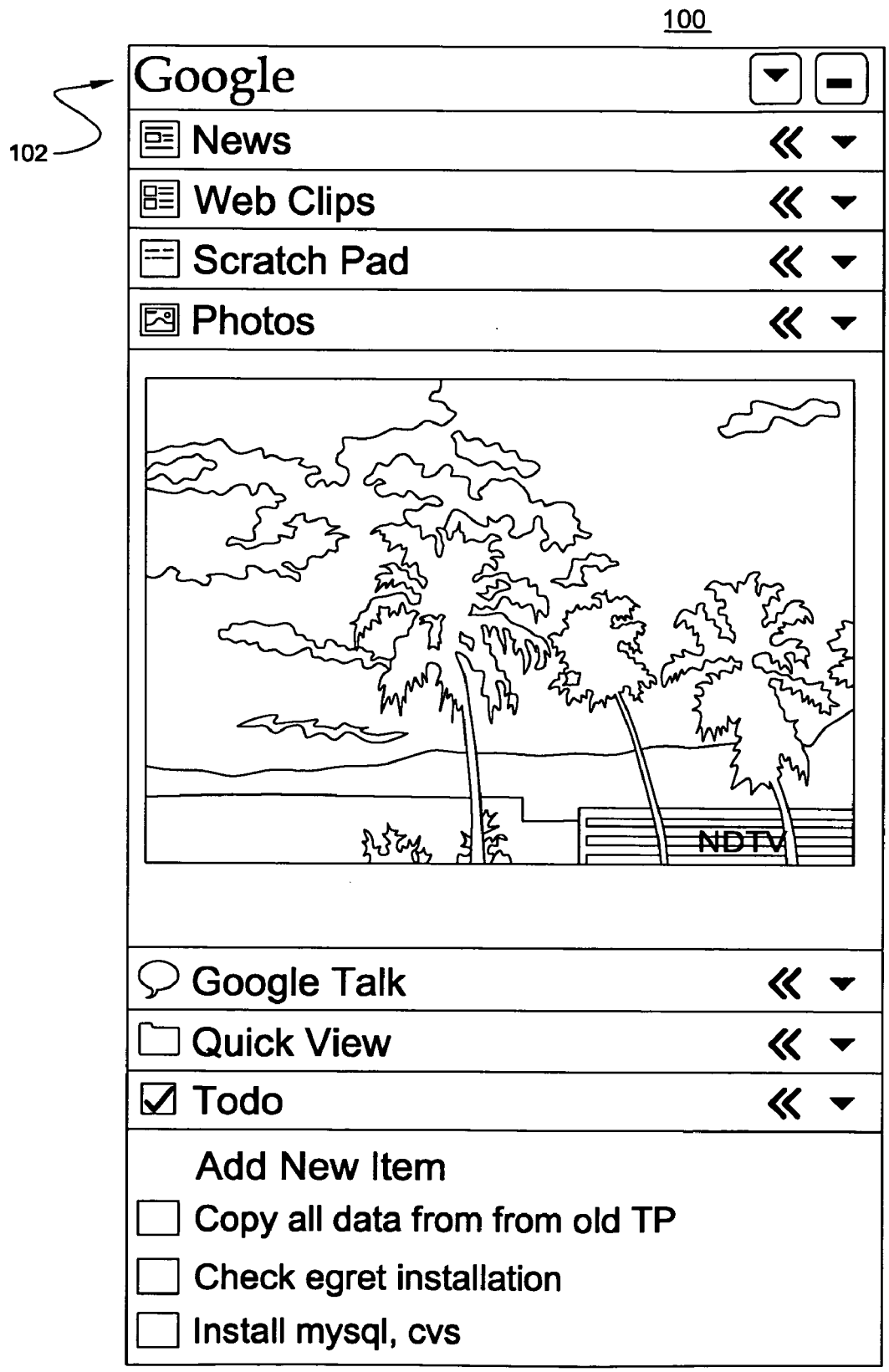
FIG. 1A shows a known visualization of information utilizing a side bar on a user's workspace.
Figure 1B:
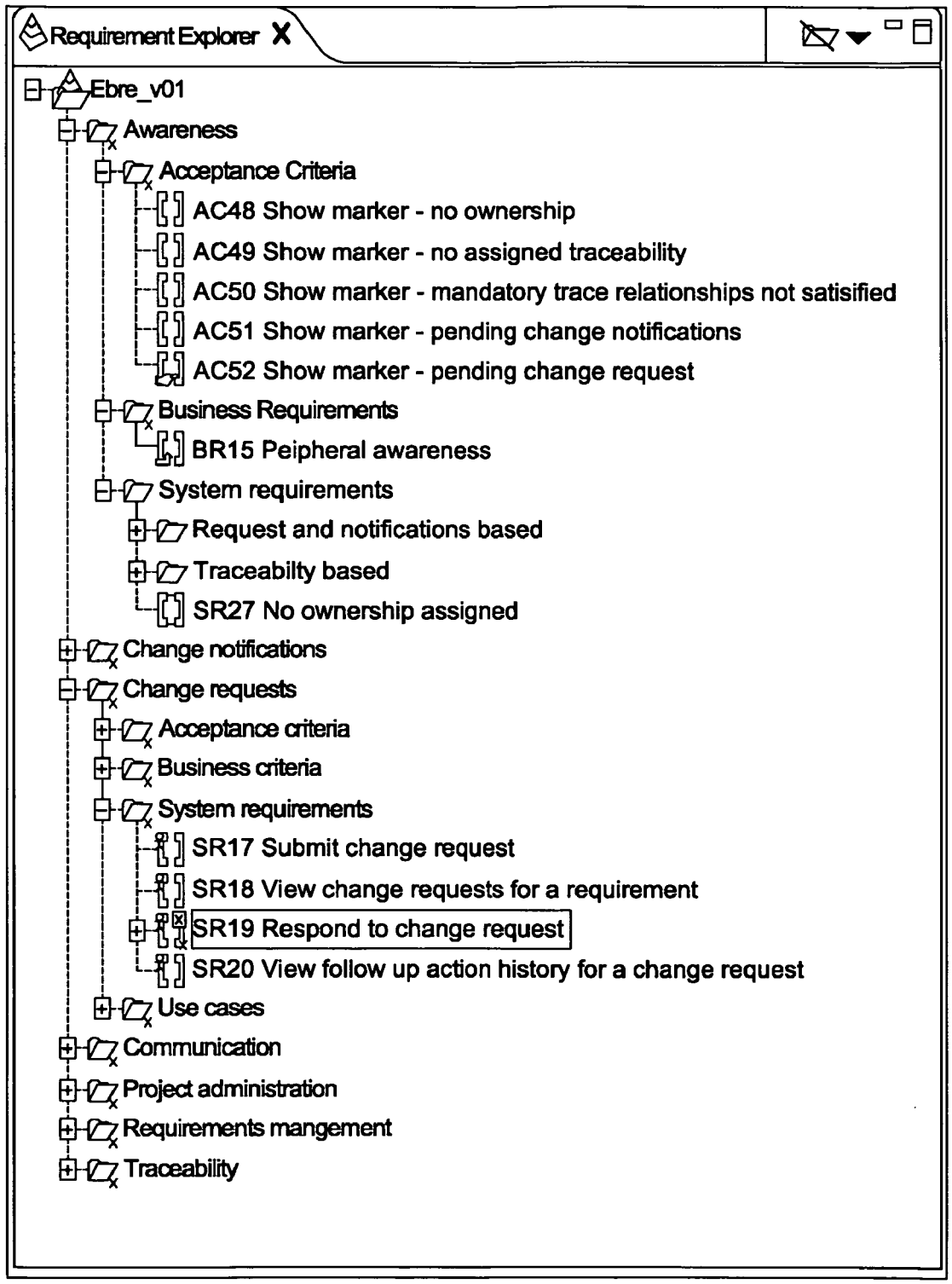
FIG. 1B shows a known visualization of information utilizing a combination of a list and tree view to summarize information related to data points in a workspace.
Figure 2A:
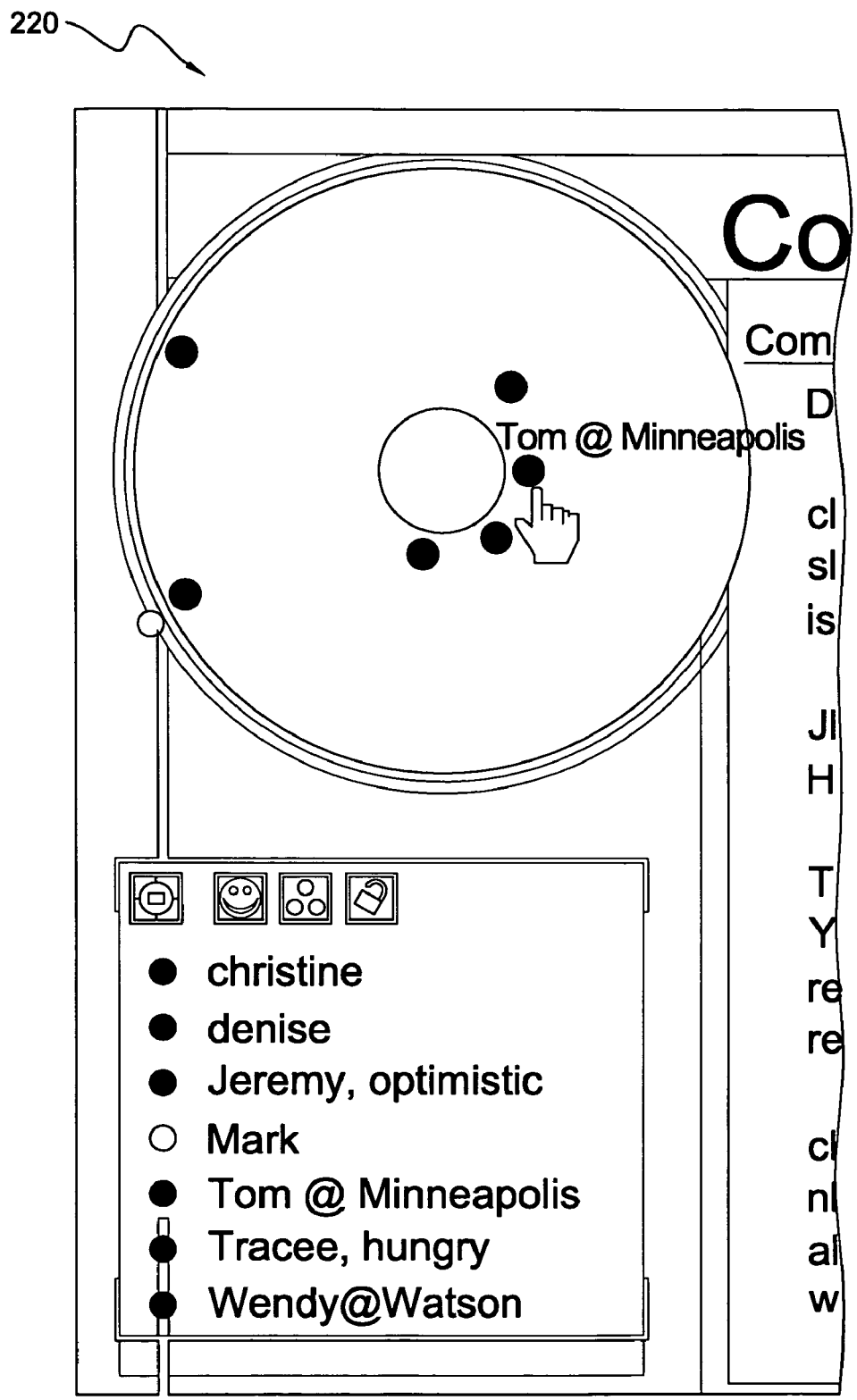
FIGS. 2A to 2D show other known visualizations of information.
Figure 2B:
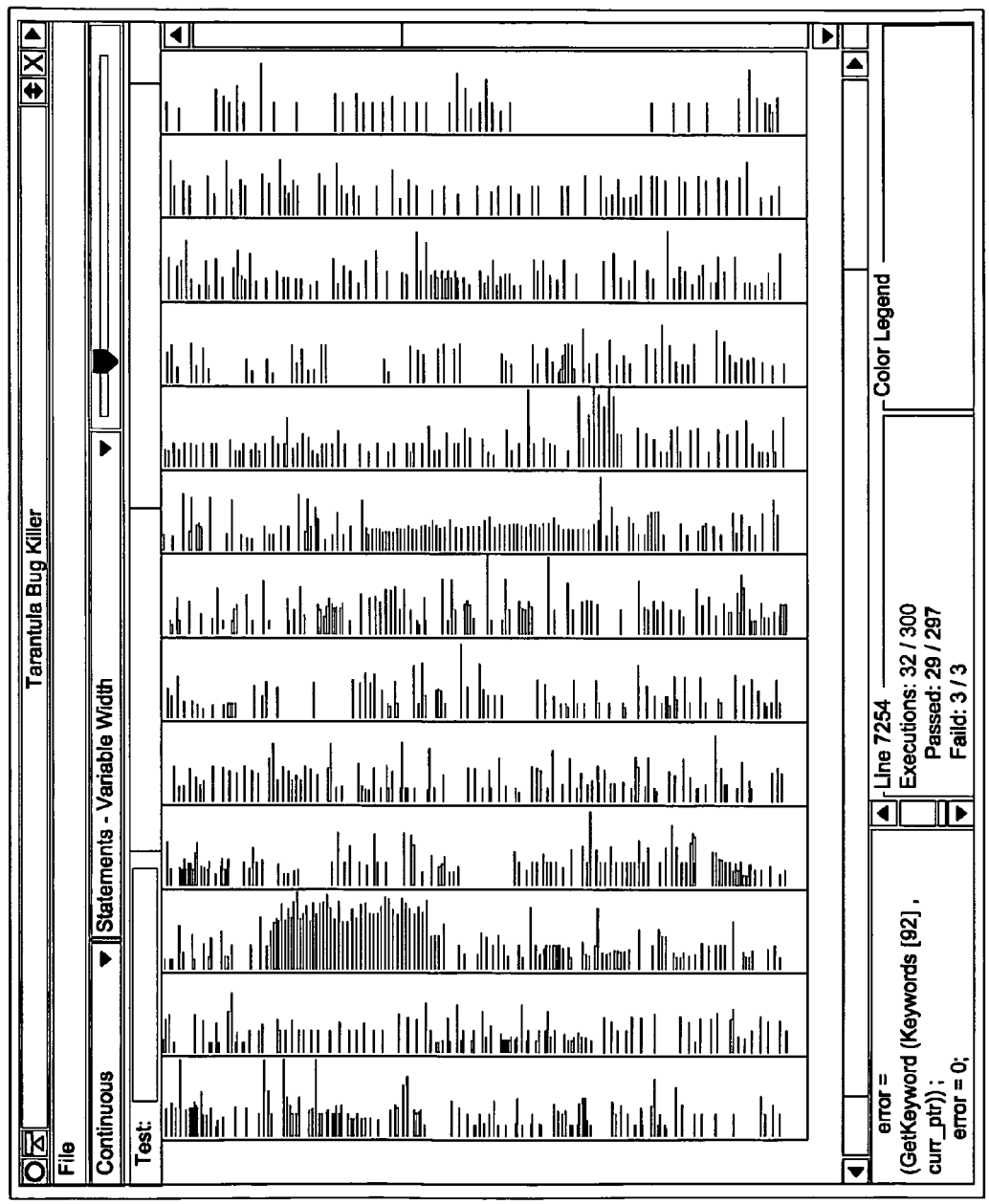
Figure 2C:
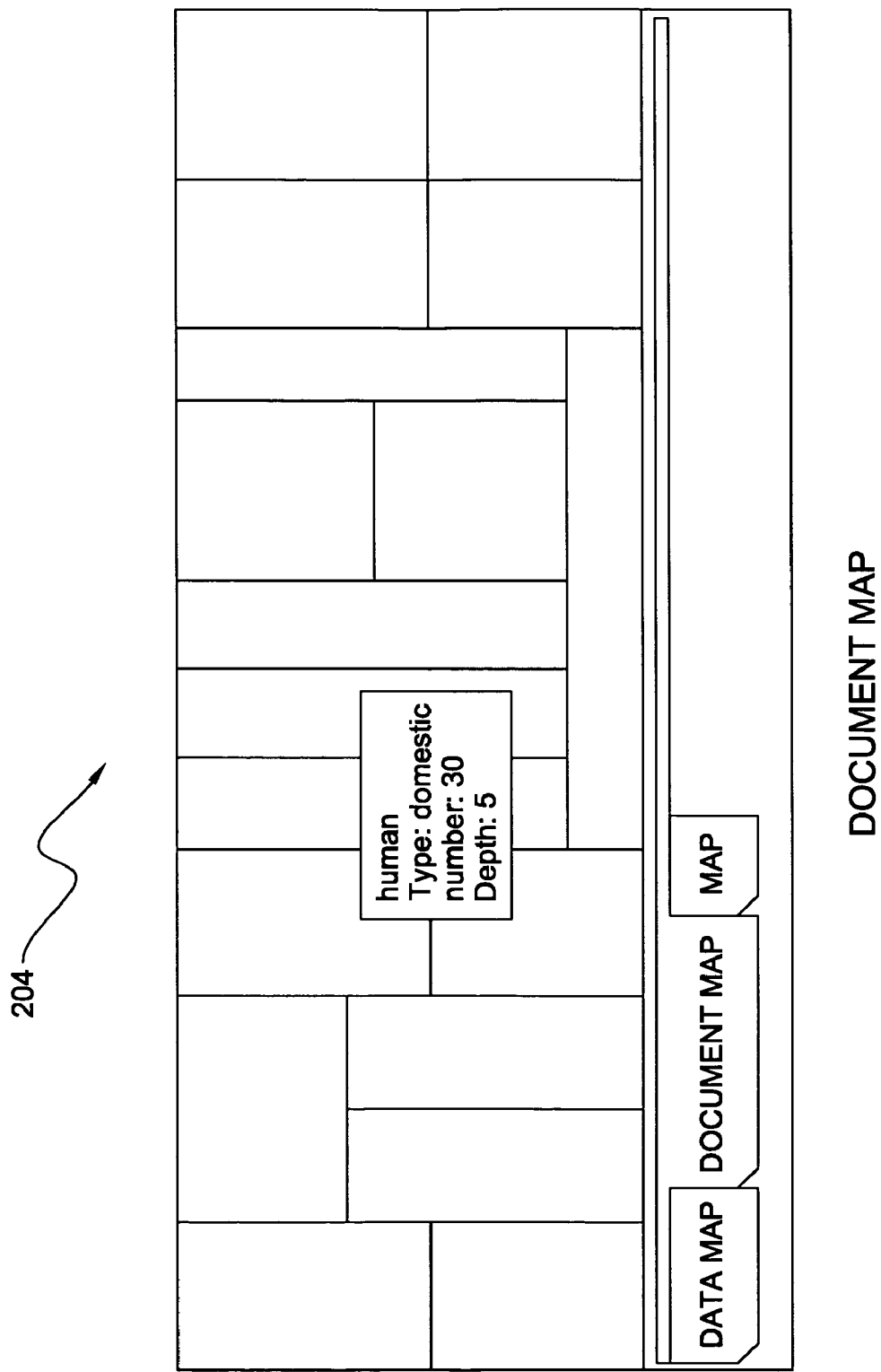
Figure 2D:
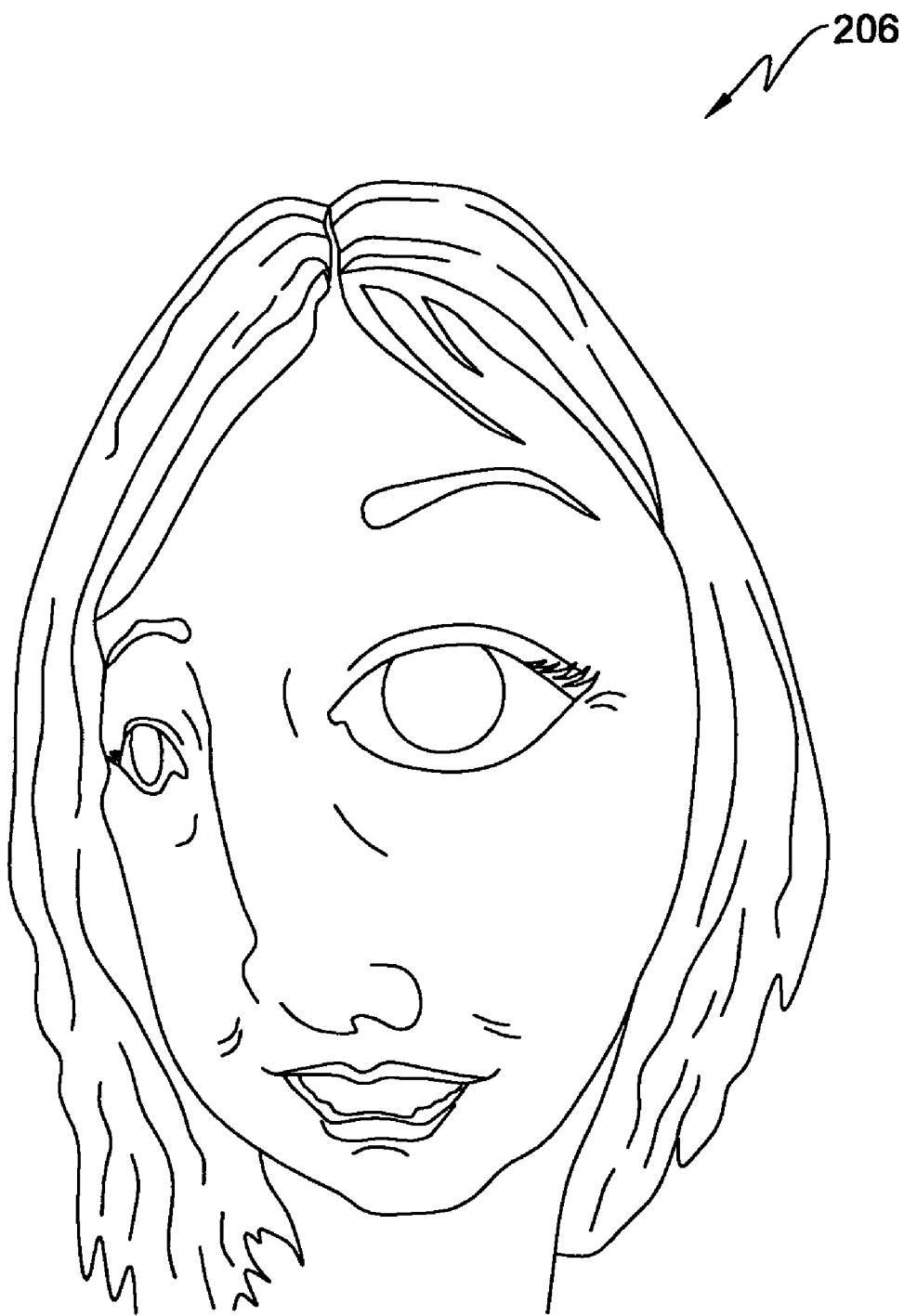
Figure 3:
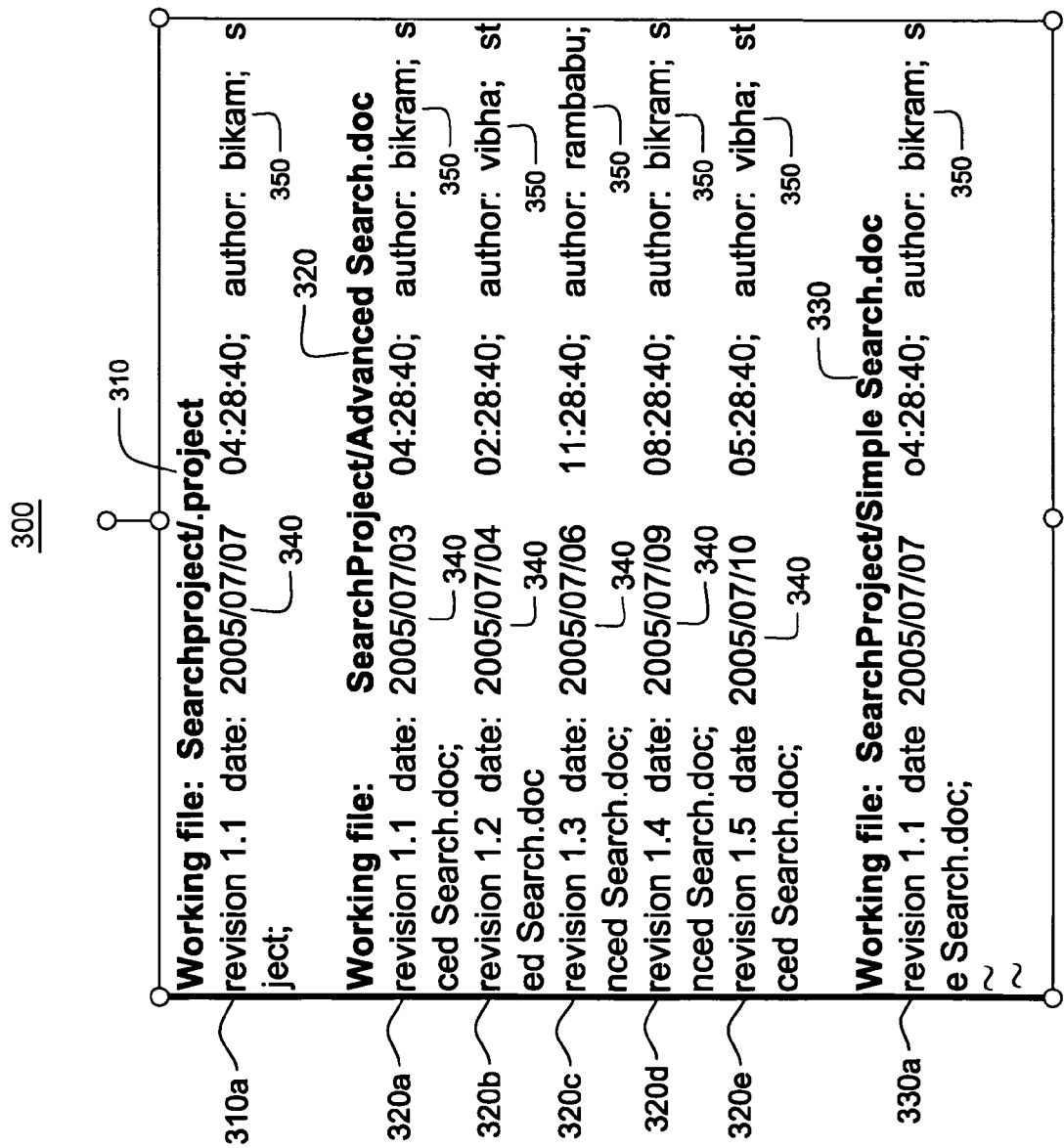
FIG. 3 shows a sample dataset to which visualization is applied.

FIG. 3 shows a sample dataset 300, which in this example is a CVS used for tracking revisions made to files. The sample dataset 300 lists files 310, 320, and 330, and records revision data 310a, 320a-320e, and 330a, made respectively to the files 310, 320, and 330. Included with the revision data 310a, 320a-320e, and 330a, are the dates associated with the revisions 340, and the authors associated with the revisions 350.

Figure 4:
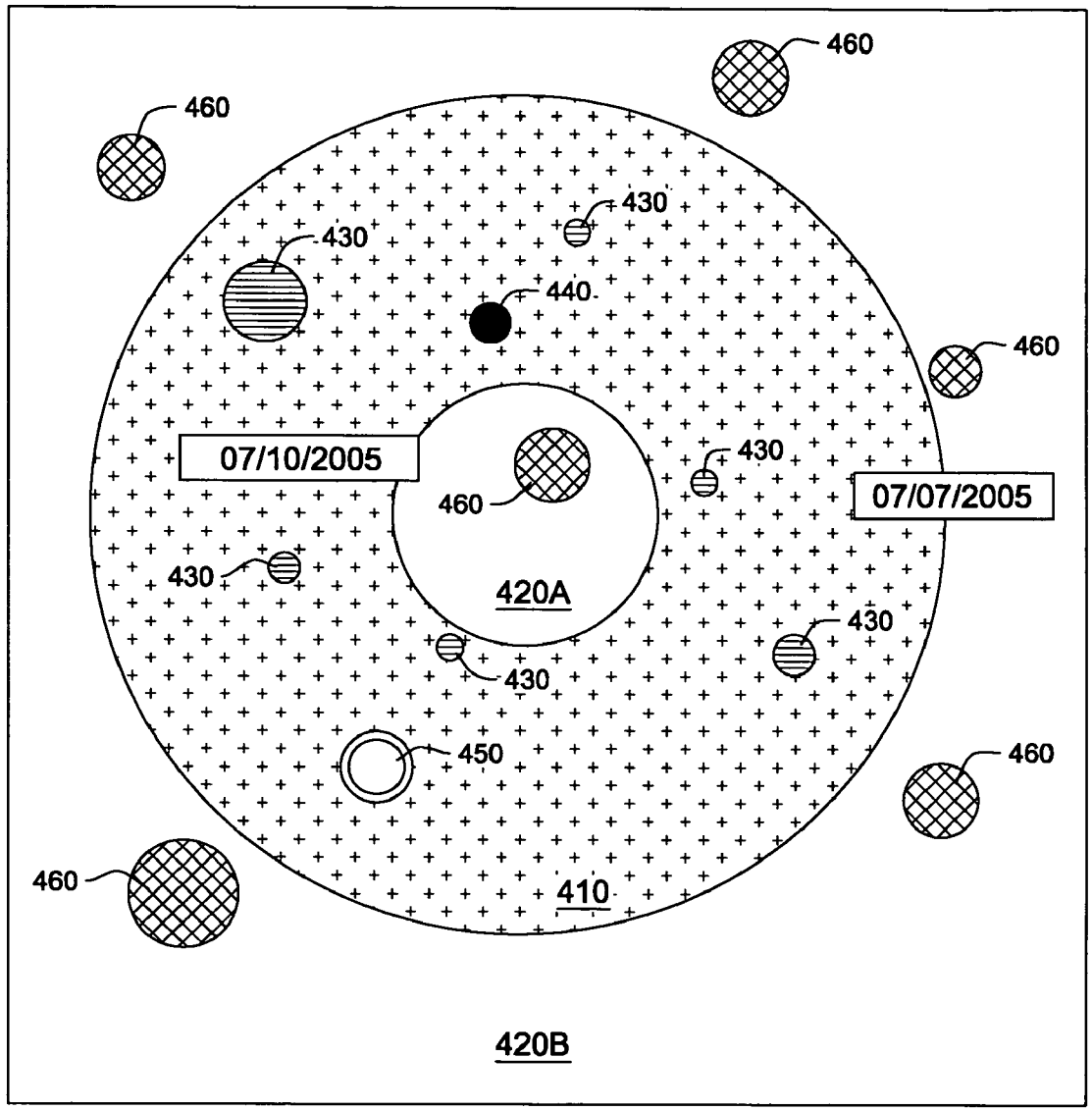
FIG. 4 shows a visualization of the dataset of FIG. 3.

FIG. 4 shows a visualization 400 of the dataset of FIG. 3 generated by the present aspect. The visualization 400 comprises a focal region 410 and two non-focal regions 420a and 420b, and various blobs 430-460 within either the focal region 410 or the non-focal regions 420a and 420b. For the CVS dataset of the present aspect, the revision dates 340 are used as focal values. The focal values for each data point (i.e. each file) are hence the last revision date of each file 310, 320, 330.

The focal region 410 is an area in which data points with focal values of a greater interest to the user are present. The focal region 410 represents a certain criteria, and in the present aspect, is a range. Specifically, the focal region 410 represents a range of dates between which revisions to the files 310-330 were made.

Files having had revisions made thereto within the range of dates encompassed by the focal region 410 are rendered as blobs in the focal region 410. In the example of FIG. 4, only one focal region 410 has been defined, but this invention is not so limited and may include a plurality of focal regions. Within the focal region 410 are all files in the CVS dataset 300 whose focal values fall within the criteria represented by the focal region 410. That is, within the focal region 410 are all files which have had revision made thereto between the dates of Jul. 7, 2005 and Jul. 10, 2005.

The non-focal regions 420a and 420b contain data-points whose focal values do not meet the criteria represented by the focal region. The data-points in the non-focal regions 420a and 420b can be clustered by, for example, grouping together all files having the same extension and lying in one particular range. The size of a cluster 460 is determined by the number of data points in the cluster.

In FIG. 4, files having had revisions made thereto outside of Jul. 10 ,2005 - Jul. 10 ,2005 are located in the non-focal regions 420a and 420b. Five clusters, represented by cluster blobs 460 in the visualization, are present in the non-focal region 420b, and a single cluster is present in the non-focal region 420a. In the visualization of FIG. 4, each cluster blob 460 clusters together files of a particular type, for example, all *.doc files, *.pdf files, etc. By clustering data-points falling outside of the focal region 410 as cluster blobs 460, cluttering of the visualization is prevented.

For example, the single cluster in the non-focal region 420a, concisely indicates that a plurality of files of a single extension type were modified in the time period after Jul. 10 ,2005.

The centre of the visualization 400 can represent either the start or the end of range of interest of focal attributes/function. The range of interest can be specified as a filtering criteria or by default it is from zero to infinity. In the particular example of FIG. 4, the centre of the focal region 410 signifies the current date. The farther from the centre of the focal region, the earlier the date.

In generating the visualization, users may specify how the focal region 410 is determined, and also what attributes are to be used to determine the shape and sizes of the data blobs, clustering criteria, and the like. In one embodiment, different colours may be used to denote the different attribute types of data, and different blob sizes may be used to enables users to relatively compare data points on specified attributes. For example, the different configurable parameters when generating a visualization, and their mapping to visual indicators, can include:

Focal attribute: Defines the focal region, e.g. radius/distance on the view.
Colour attribute: For mapping the colour of a data blob to an attribute.
Shape attribute: For mapping the shape of a data blob to an attribute
Clustering attribute(s): Clustering criteria for data items outside the focal region.
Size attribute: For mapping the size of a data blob to an attribute. This attribute is only used to calculate the size of blobs which fall in the focal regions. For blobs in the non-focal regions, the number of data points in each cluster is used to calculate the size.

It should be apparent to a person skilled in the art that various other representations may be used to defined the attributes and such representation fall within the scope of this invention.

Table 1 below shows the configurable parameters used in generating the visualization 400 of the CVS dataset 300:

TABLE 1

1.

| Parameter | Attribute |
| --- | --- |
| Focal point & radius | Time of activity Single focal region specified |
| Blob Colour | Individual Documents - Red (shown darkest grey in figures) Clusters - Yellow (shown lightest grey in figures) Others - Blue (shown medium grey in figures) |
| Blob Size | Number of revisions |
| Blob Shape | Circle - Normal Double circle - Specified user is related to the data item. (e.g. specified user had previously revised the file) |
| Clustering | Based on document type. (e.g. doc, pdf, etc) |

The visualization 400, when generated according to the configuration parameters of Table 1, displays individual document 440 in red, clusters 460 in yellow, and all other blobs 430, 450 in blue. The clusters 460, according to the configurable parameters of Table 1, groups together documents based on document type. The blob 450, having a double circle shape, corresponds to a document that is related to a specified user. In the example of FIG. 4 and Table 1, the relation between the document represented by the blob 450 and the specified user is that the specified user had previously revised the file.

From the properties of Table 1, the visualization is visually rendered on a display, or other presentation device such as a printer and the like. Alternatively, the visualization may be 'rendered' to a file, allowing for remote rendering of the visualization over a network, or at a later time, and/or by third party renderers. This provides flexibility on how the visualization may be displayed, and also realizes portability in terms of being able to display the visualization on a variety of devices and systems (e.g. Macintosh, personal computers, laptop computers, Unix, Windows, PDAs, Mobile Phones, etc.), and to a variety of applications/environments (e.g. web-based documents via plug-ins, 3D applications, etc.).

Once the visualization is rendered, whether visually or otherwise, it can be set to automatically refresh periodically. For example, the user can specify a time periodicity or an absolute time at which data is to be refreshed. Data can then be automatically fetched from single or multiple datasets and collated together based on different visualization parameters i.e. size, colour, shape, clustering, focal region, and the like, and re-rendered on display or on file.

Gestures

The visualization 400 can be made to support gestures, to facilitate intuitive and efficient presentation and amendment of information. Table 2 below lists some exemplary gestures for extending the functionality of the visualization 400 of FIG. 4:

TABLE 2

1.

| Gesture | Action |
| --- | --- |
| Hover | Show details of blob being hovered on |
| Drag cluster into focal region | Re-aggregates the view such that the cluster dragged becomes the region of interest, with the focal region now centred thereon |
| Drag inner or outer boundary of focal region | Changes focal region |

Figure 5:
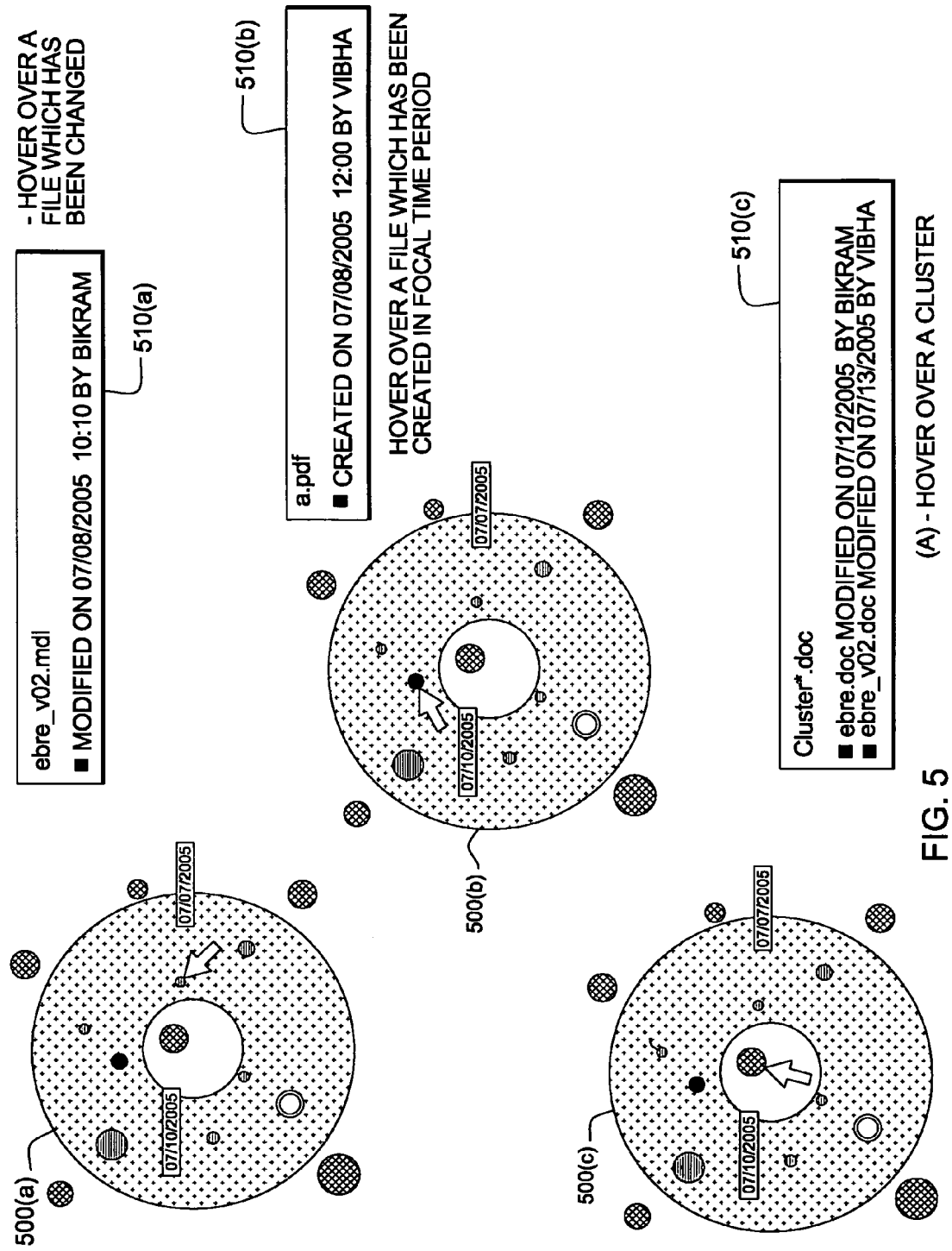
FIG. 5 illustrates changes to a visualization in response to a gesture.

FIG. 5 illustrates changes to the visualization 400 in response to a hover gesture. By hovering a cursor over a blob as shown by 500(a)-500(c), detailed information 510(a)-510(c) can be displayed. Detailed information 510(a)-510(c) displays, for example, the file name corresponding to the data point being hovered on, the date at which it was revised, and the author of the revision. In the case of a cluster blob, the detailed information 510(c) displays detailed information for each file within the cluster. Detailed information can therefore be efficiently displayed and amended, as required.

Sub-Screens

According to a further aspect of this invention, sub-screens are provided as a way to focus in on required information. Sub-screens allow filtering criteria to be specified, to limit the data-points being used to render the visualization, and to display the limited set of data-points separately.

Sub-screens may be created by specifying different filtering criteria. The filtering criteria can be specified as a range of values for a single attribute or a function of multiple attributes of the dataset. Specifying filtering criteria opens up a sub-screen beside the main visualization. This sub-screen visualizes a part of the whole data space, that is, it contains information on a restricted set of data points, out of the whole data space, which satisfy the filtering criteria. Sub-screens can be used to reduce the amount of information being displayed on the screen, and/or to view limited data points in greater detail. By displaying a sub-screen as a separate visualization from the main screen, users can be made aware of the fact that they are viewing a restricted set of information from the whole data-space. Further, users can easily shift their attention to the main space as and when desired.

Figure 6:
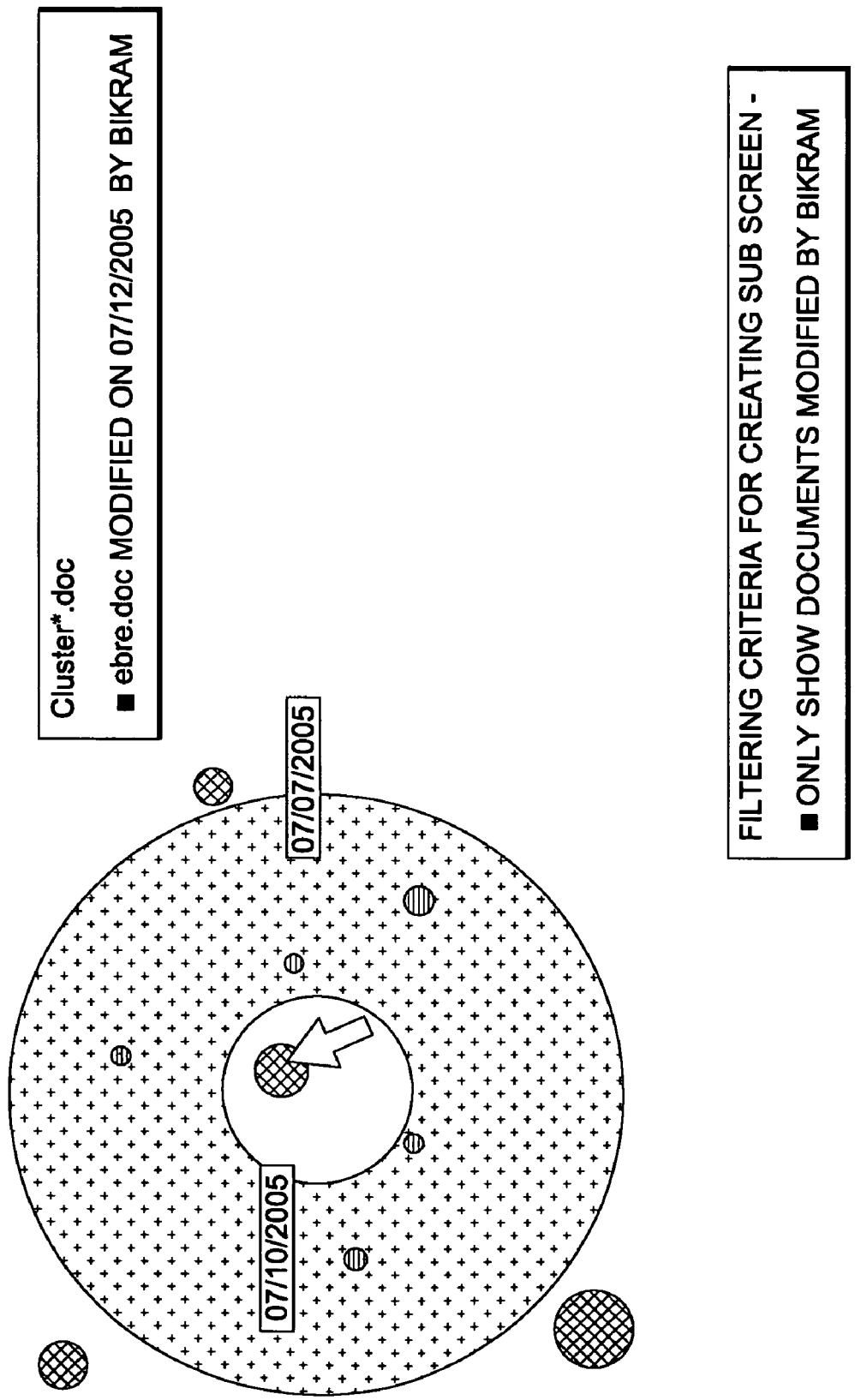
FIG. 6 illustrates a sub-screen visualization according to an aspect of the invention.

FIG. 6 shows a sub-screen created from the visualization of the CVS log data in FIG. 4. The filtering criteria specified here shows only those data points in the visualization which have been modified by the author 'Bikram'. The sub-screen appears beside the main screen displaying the visualization of FIG. 4. Hovering over the data blob in the innermost circle of the sub-screen shows that the cluster only includes *.doc extension documents from Bikram.

Whilst a user can, instead of utilizing sub-screens, filter the data points on the main visualization by specifying the same filtering criteria, sub-screens allow both the filtered data-set and the main data-set to be concurrently displayed. Multiple sub-screen can also be created, allowing the user to flexibly visualize multiple areas of the data-set as per the user's preference.

Super Screens

Figure 7:
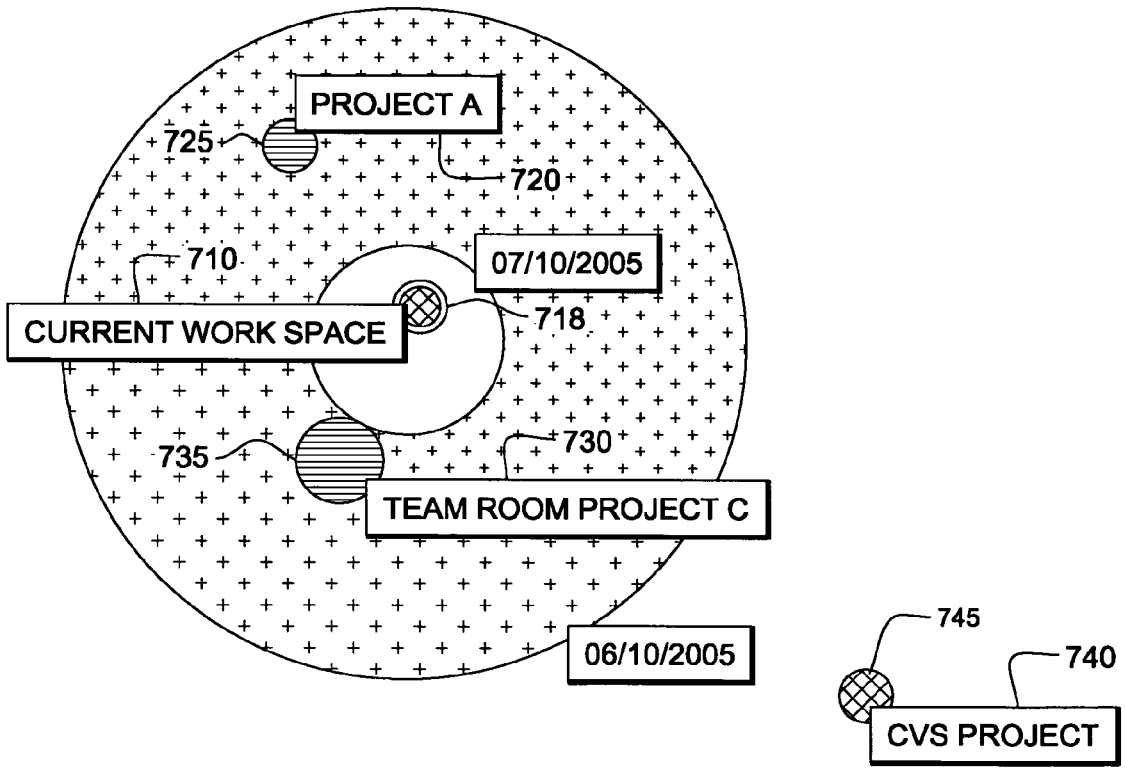
FIG. 7 illustrates a super screen visualization according to an aspect of the invention.

FIG. 7 illustrates a further aspect of this invention employing a super screen visualization. The super screen visualization arranges data from multiple data spaces. The super screen allows multiple data spaces to be monitored, whilst still keeping the data points from each space separate. Each data space appears as a blob 715, 725, 735, and 745 on the screen which can then be further expanded using sub-screens to display the corresponding visualization for each data space. In the example of FIG. 7, the super screen 700 provides a visualization of four different data spaces, including the current CVS workspace 710 corresponding to the visualization of FIG. 4. Project A 720, Team Room Project C 730, and another CVS workspace (Project B) 740.

Super screens allow a user to compare data spaces based on selected attributes as specified by the focal region and size calculator. For example, from FIG. 7, it is evident from the position of the representative blobs that the most recent activity has been in the current workspace 710, followed by Team Project C 730, Project A 720 and then CVS Project B 740. The blobs can be compared based on their sizes, such that by correlating the size of a blob to, for example, the number of documents involved in a project, it can be seen that CVS project B 740 involves the most numbers of documents, followed by team room project C 730, the current space 710, and then project A 720.

Operation

Generation of visualizations such as those shown by FIGS. 4 to 7 are described with reference to FIGS. 8 to 10D.

Figure 8:
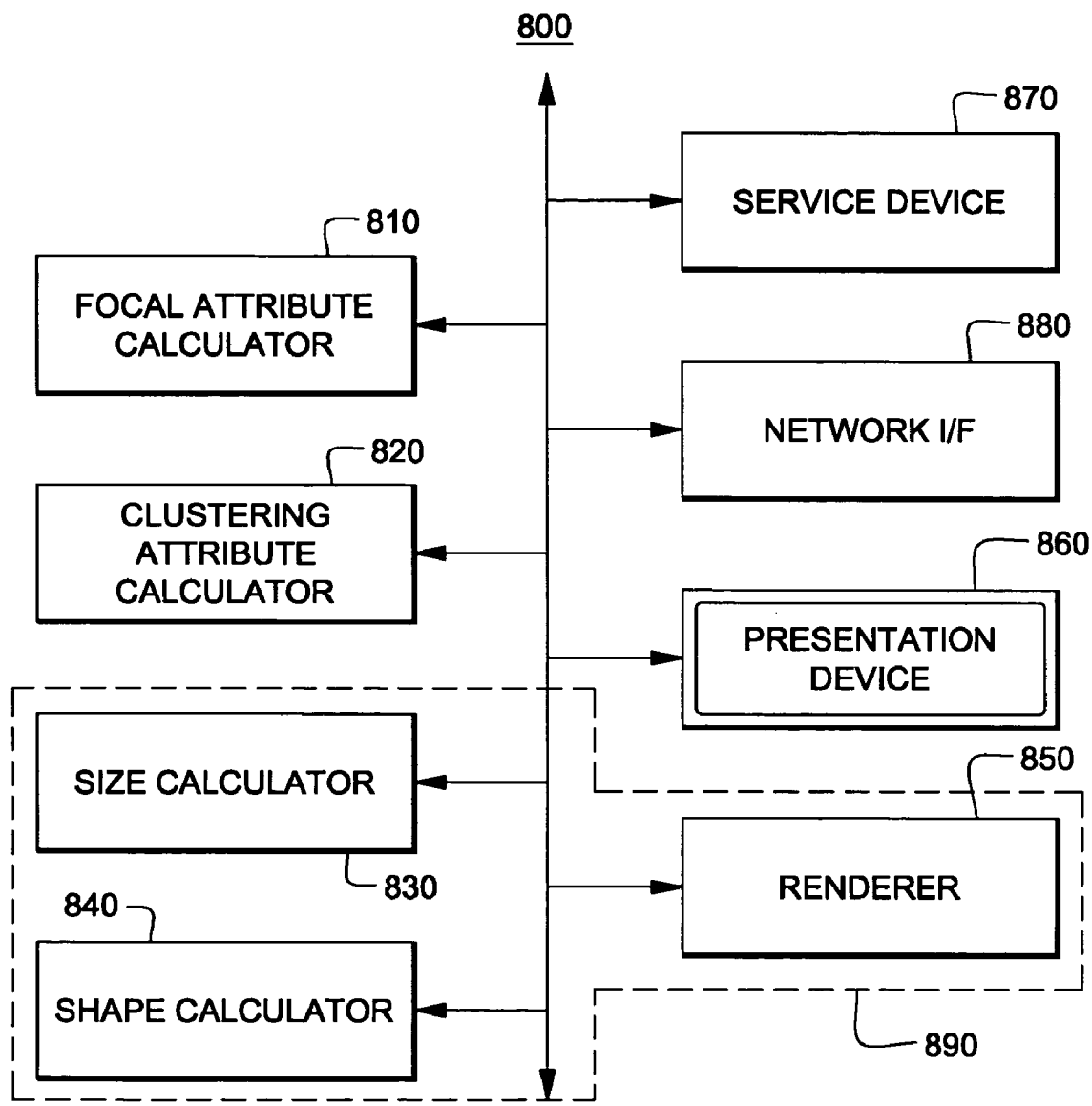
FIG. 8 shows a visualization device according to an aspect of the invention.

FIG. 8 depicts a visualization generator 800 of this invention. The visualization generator 800 includes a focal attribute calculator 810, a clustering attribute calculator 820, a size calculator 830, a shape calculator 840, and a renderer 850. The visualization generator 800 may also include a storage device 870, and a network interface 880. The size calculator 830, the shape calculator 840, and the renderer 850 comprise a visualization shaper 890.

Each of the focal attribute calculator 810, the clustering attribute calculator 820, the size calculator 830, the shape calculator 840, and the renderer 850 may be realised as individual hardware modules, such as in the form of CMOS circuitry, or as software modules executable on a processor.

The visualization generator 800 receives as input a dataset having specific attributes and values, and calculation and sorting functions which can be applied to the dataset. Generated visualizations are stored in the storage device 870, transmitted over a network via the network interface 880, and output to a presentation device 860, or any combination of the above. The visualization generator 800 optionally further receives configurable parameters such as those shown in Table 1, but can otherwise revert to default parameters in the absence of such parameters.

Figure 9:
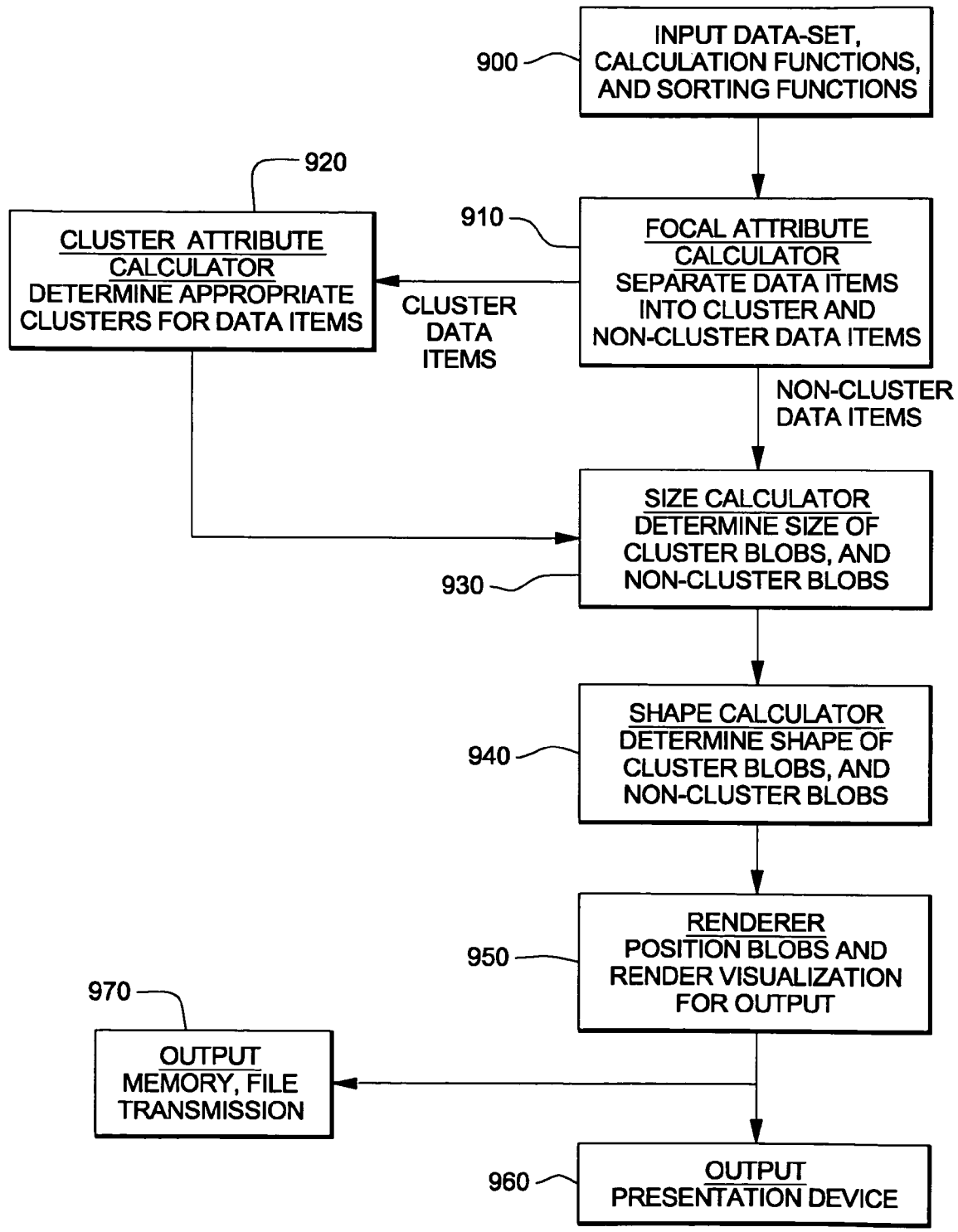
FIG. 9 is a flow diagram providing an overview of an operation of the visualization device.

FIG. 9 illustrates an operation of the visualization generator 800 of FIG. 8.

At block 900, inputs are supplied to the visualization generator 800 and received by the focal attribute calculator 810. The focal attribute calculator 810 determines which data items are to be clustered, and which data items are to be shown individually (block 910). Data items to be clustered are passed to the clustering attribute calculator 820, which determines an appropriate cluster in which to cluster such data items (block 920), and then further passed to the size calculator 830. Data items to be shown individually (un-clustered) are passed directly to the size calculator 830.

The size calculator 830 determines the size of each blob to be displayed (block 930), and the shape and colour calculator 840 determines the shape and colour of each blob (block 940). The size, shape and colour of each blob determined respectively by the size calculator 830 and the shape and colour calculator 840 are in accordance with configurable parameters, such as those of Table 1, entered to the renderer 850, or in accordance with a default set of parameters. The renderer 850 renders a visualization in accordance with the determined sizes, shapes, cluster blobs, and individual blobs (block 950) for output to a presentation device such as a display device (block 860). Alternatively, the renderer 850 'renders' the visualization to a data file, which can be visually rendered at a later time, transmitted for rendering by a remote device, provided to third party renderers to be custom rendered, or any combination of the above.

The size calculator 830, the shape and colour calculator 840, and the renderer 850 together constitute a visualization shaper 890 which positions, shapes, and sizes blobs, focal regions, and non-focal regions with respect to each other to form the visualization.

Figure 10A:
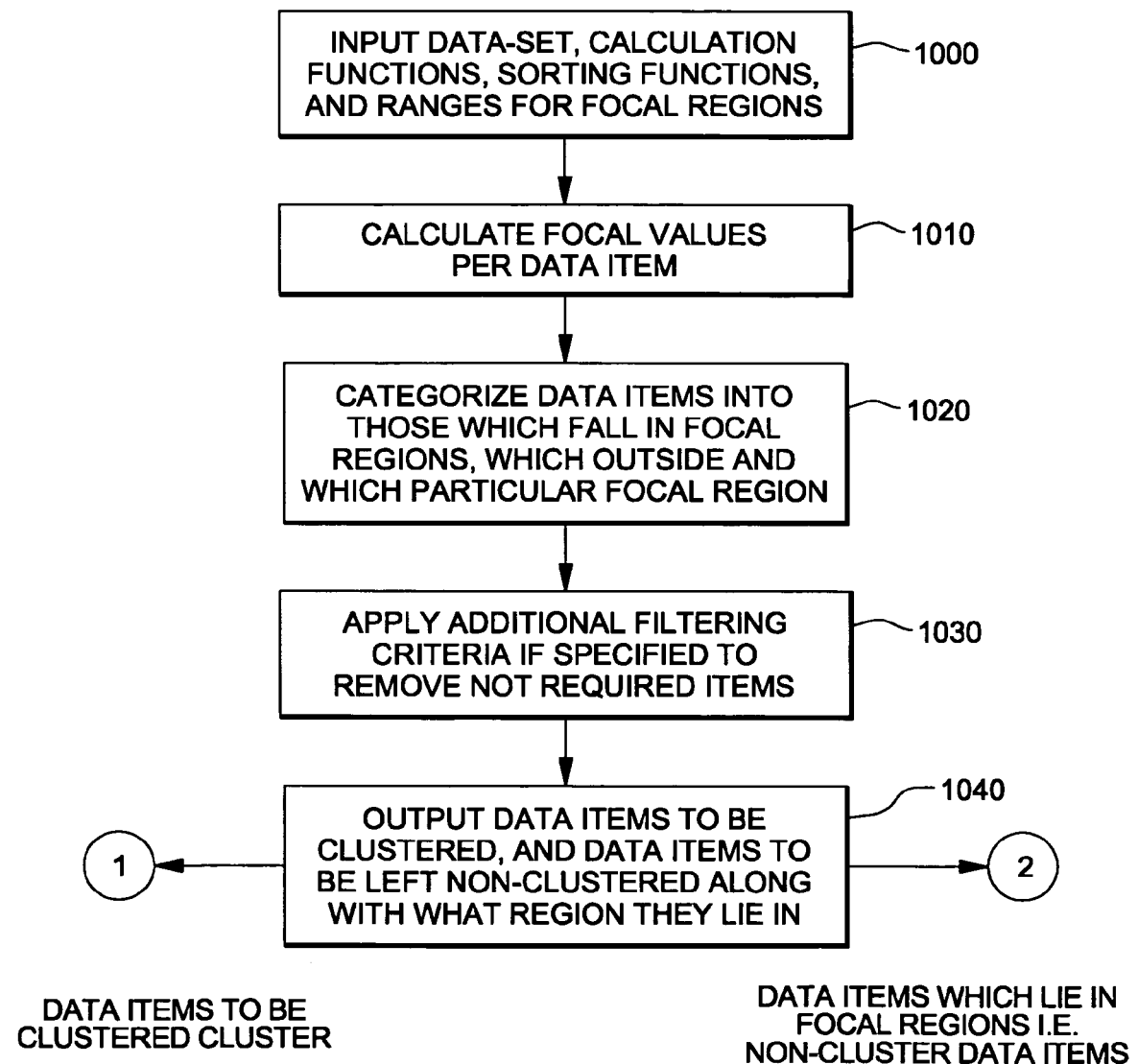
FIG. 10A is a flow diagram illustrating the operation of a focal attribute calculator.
Figure 10B:
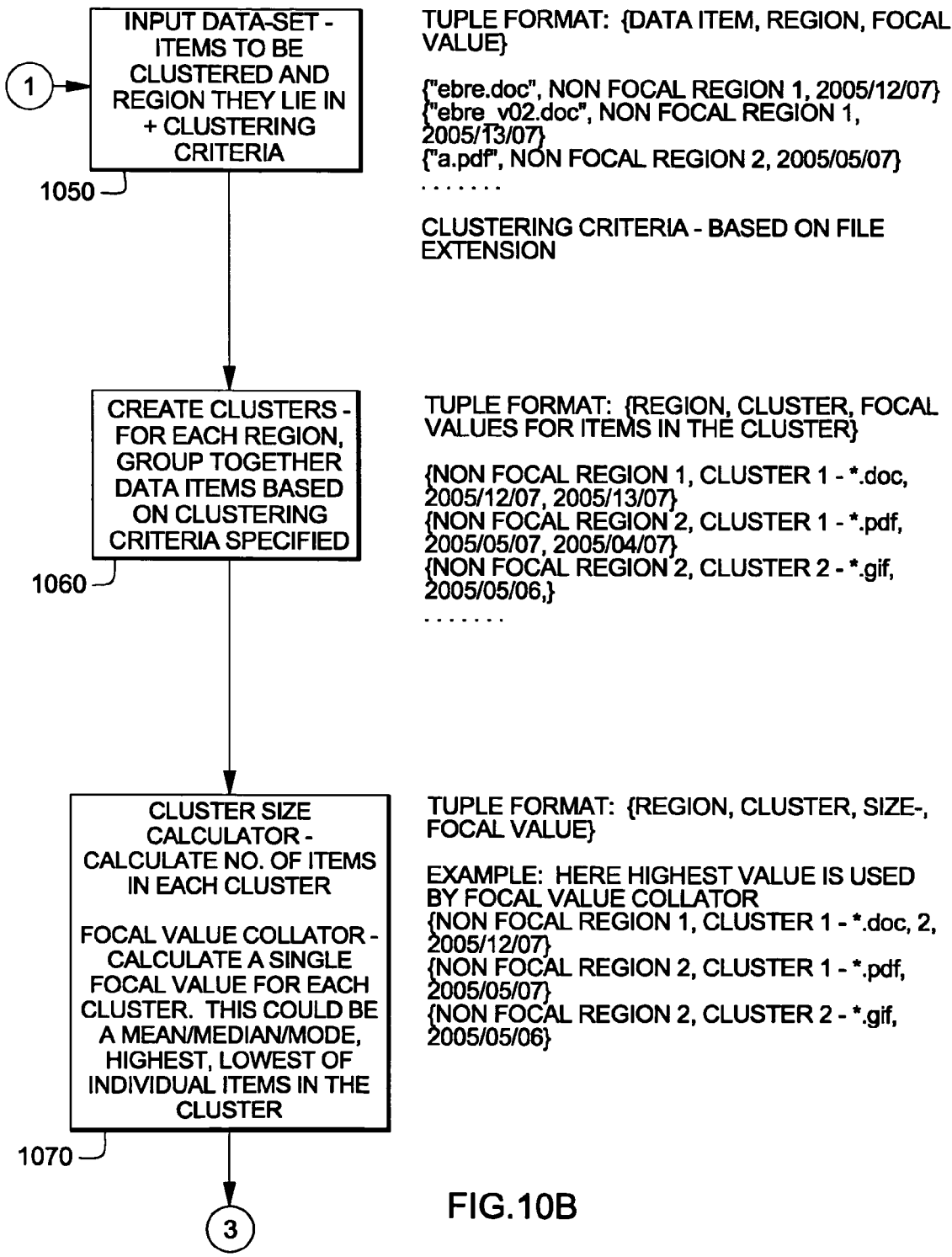
FIG. 10B is a flow diagram illustrating the operation of a clustering attribute calculator.
Figure 10C:
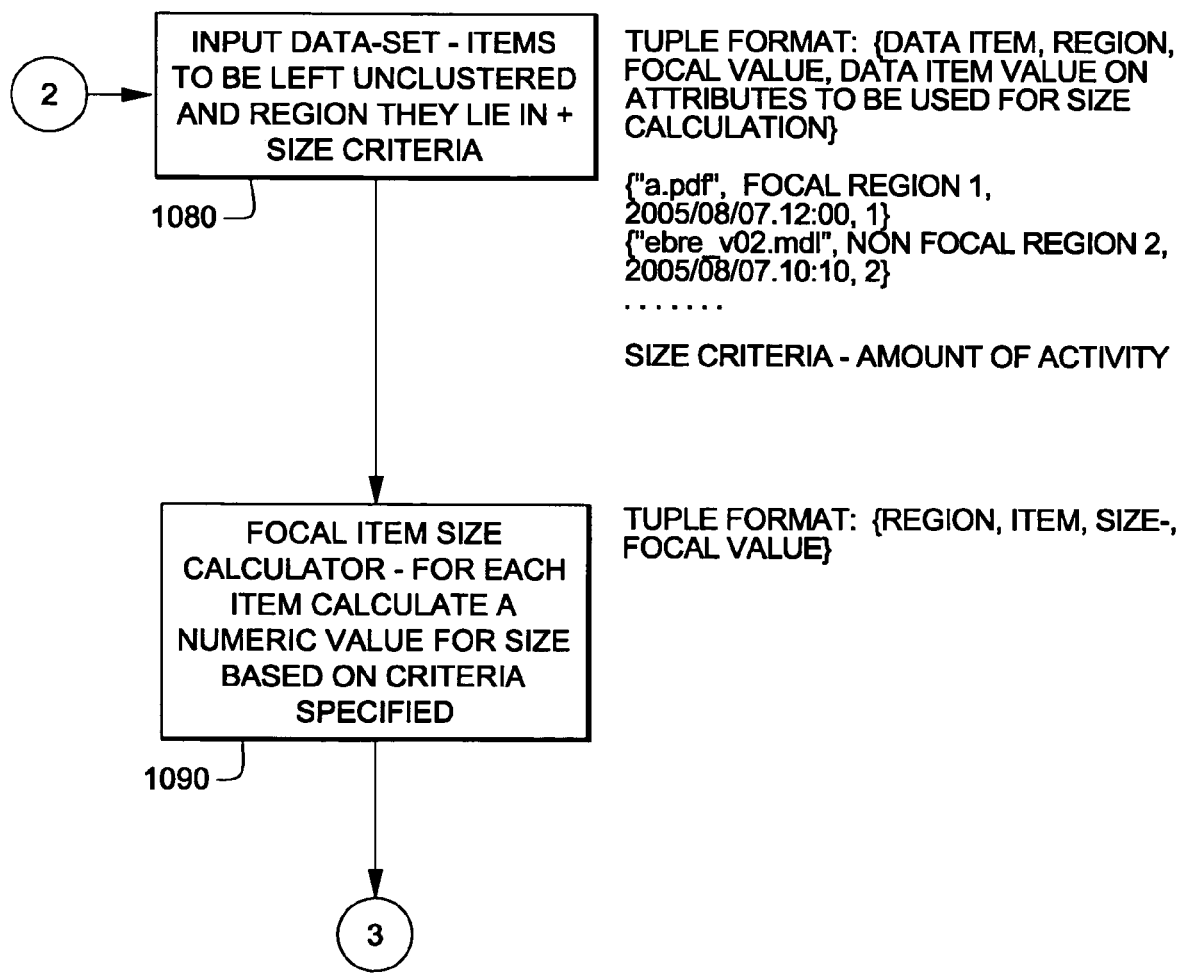
FIG. 10C is a flow diagram illustrating the operation of a focal item size calculator.

FIG. 10A illustrates an operation of the focal attribute calculator in greater detail. As shown at block 1000, the inputs supplied to the visualization generator 800 are provided to the focal attribute calculator 810. In particular, attributes and values of the dataset, functions to calculate a focal value, functions to sort focal values, and ranges for focal regions, are provided to the focal attribute calculator 810. Focal values for each data item of the inputted dataset are then calculated (block 1010) and categorized into data items falling within the focal region, and data items falling without the focal region (block 1020). Additional filtering criteria are applied, if specified, to remove specific data items (block 1030). In this manner, items to be clustered and individual items to be left un-clustered are identified. Items identified as to be clustered are output separately from items identified as to be left un-clustered (block 1040).

The items identified as to be clustered are provided to the clustering attribute calculator 820. An operation of the clustering attribute calculator 820 is illustrated with reference to FIG. 10B. The input to the clustering attribute calculator 820 is provided as a tuple (block 1050). The tuple has a format of for example:

{data item, region, focal value}

The clustering attribute calculator 820 creates clusters by grouping together data items based on a specified clustering criteria (block 1060). The clustering criteria can be, for example, to cluster all files of the same extension. For example, a cluster tuple is created in the format of:

{region, cluster, focal values of items in the cluster}

The cluster tuple is provided to a cluster size calculator 830. Based on the number of items (tuples) in each cluster, a numerical size of a cluster blob to represent the cluster tuple is determined (block 1070). The focal attribute collator calculates a single focal value for each cluster which is a function of the values of individual items in the cluster. This could be a mean/median/mode, highest, lowest of individual items in the cluster (block 1070). The determined size and focal value is inserted into the cluster tuple to create a cluster-blob tuple having a format of:

{region, cluster, size, focal value for items in the cluster}

The cluster-blob tuple is subsequently passed to the shape calculator 940.

The items identified as to be left un-clustered are provided straight to the focal item size calculator 830. As illustrate by the flow diagram of FIG. 10C, the focal item size calculator 830 receives an input data set in the form of a tuple having a format of:

{data item, region, focal value, value of data item attribute(s) used for size calculation}

From the attributes provided in the tuple, the focal item size calculator 830 calculates a numerical size a data blob for representing the tuple. The calculation may be based on a specified criteria/function provided by the user, or a default criteria/function. An item-blob tuple is created, having a format of:

{region, item size, focal value}

Figure 10D:
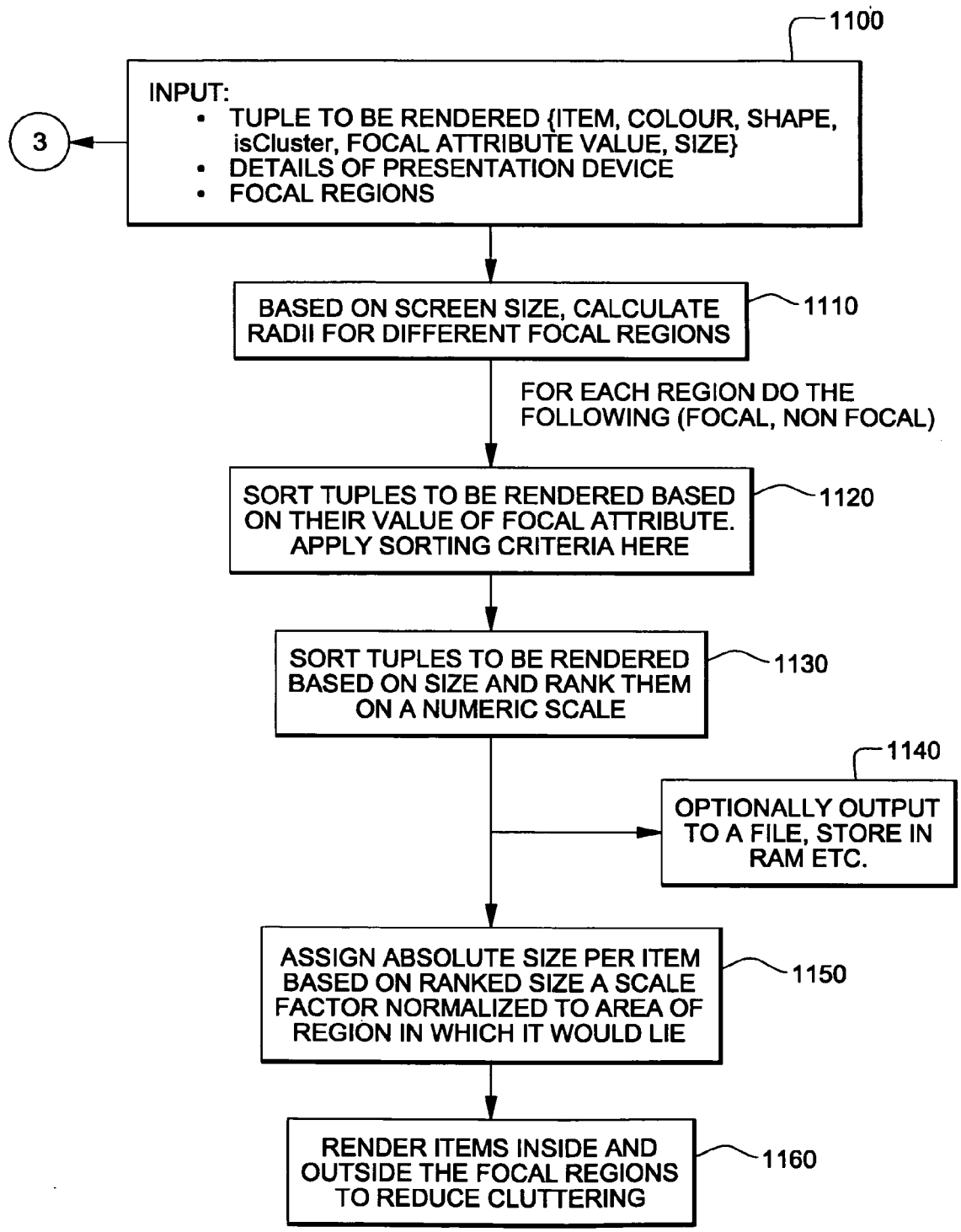
FIG. 10D is a flow diagram illustrating the operation of a renderer.

FIG. 10D illustrates an operation of the renderer 850 in greater detail. The renderer 850 receives as input: a tuple to be rendered, details of the presentation device, and details of the focal regions (block 1100). Each tuple includes, for example, an identification of the item (in the case of the CVS example of FIGS. 3 and 4,) the filename, colour, shape, size, whether the tuple is a cluster tuple, and the focal attribute value of this data item. For the CVS example of FIGS. 3 and 4, an exemplary tuple would be as follows:

{"Advanced Search.doc", blue, double circle, not cluster, Jul. 10 ,2005}

Based on the details of the presentation device, such as for example size or resolution of the display, the renderer 850 calculates a radius for each region (blocks 1110). The tuples to be rendered are sorted based on their value of the focal attribute (blocks 1120). The tuples may, for example, be sorted in either ascending or descending order. When the focal attributes are non-numeric values, a criterion may be specified in the form of a function to be applied for sorting. The tuples are further sorted based on size, and ranked accordingly (blocks 1130).

At this point, the tuples contain all necessary information to realize a visualization of the data points. The tuples may be visually rendered and displayed on a presentation device such as a monitor or a printer (blocks 1150 and 1160), or may be saved to a file for rendering at a later time, and/or by a third party renderer (block 1140).

To realize visual rendering of the visualization, each tuple is represented by a blob. A blob representing a tuple is assigned an absolute size based on the tuple's ranked size multiplied by a scale factor normalized to an area of the focal region in which the blob will lie (blocks 1150). The blobs inside and outside the focal regions are then rendered so as to minimize cluttering (blocks 1050) Cluttering can be minimized by, for example, varying the angle at which representative blobs for each item are rendered such that spacing between blobs in same region is maximized.

Figure 11:
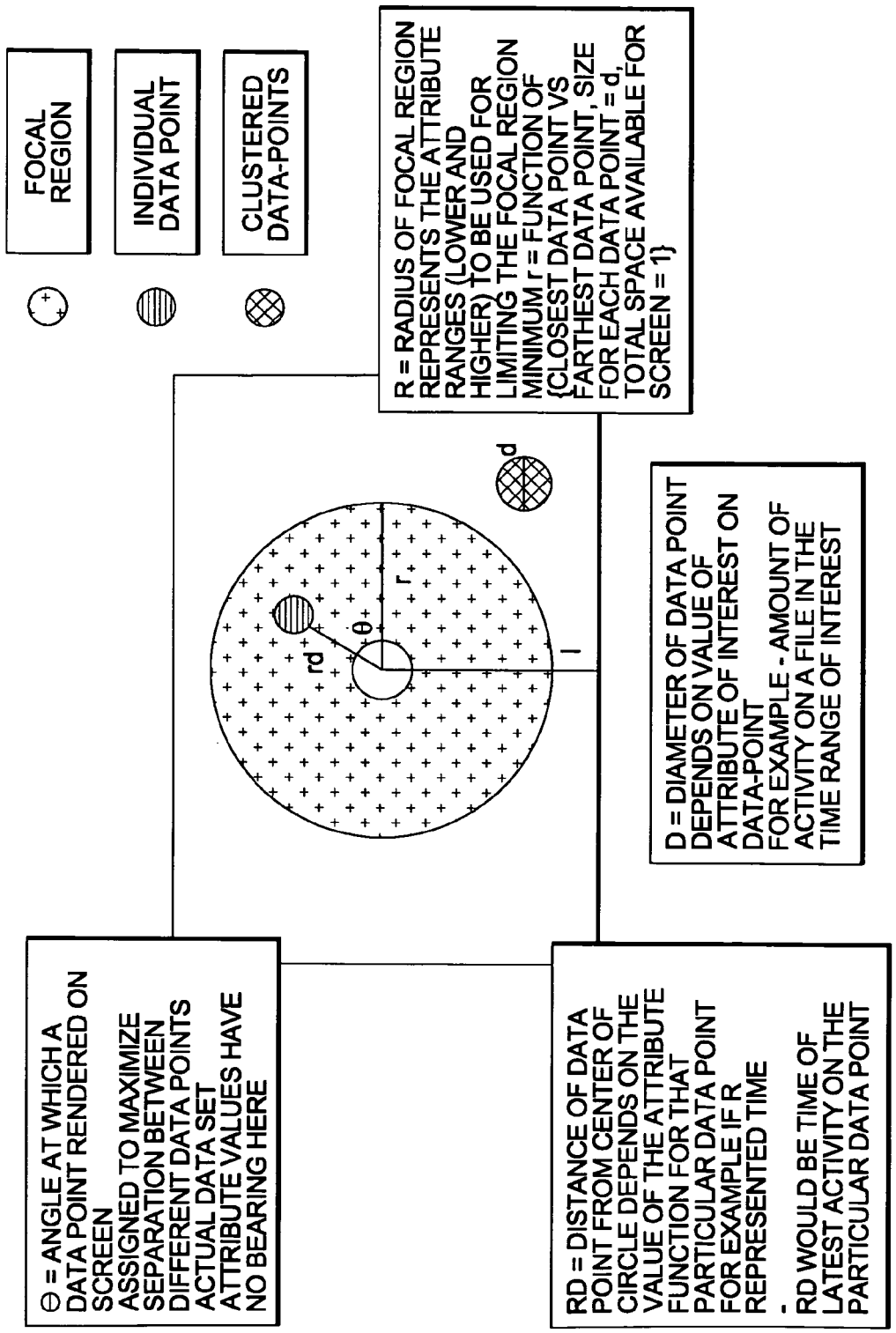
FIG. 11 illustrates clustering of blobs to reduce cluttering.

FIG. 11 illustrates the mapping used by the renderer to map physical attributes on the visual to the semantic information/attributes as provided in the dataset and collated as tuples. The physical attributes include radius (r), angle at which blobs rendered (Θ), distance of blobs from centre of visual (rd), size of blobs (d) and length of the visual (l). The semantic attributes include value of focal attribute, size as given in tuple, colour etc as calculated by different calculators (mentioned above)

Further Applications

It is readily envisioned that this invention find application in any situation where there is a need for intuitive and efficient assimilation of information, in particular, large and dynamically changing information-sets. For example, this invention may be applied to the following systems discussed below.

Figure 12:
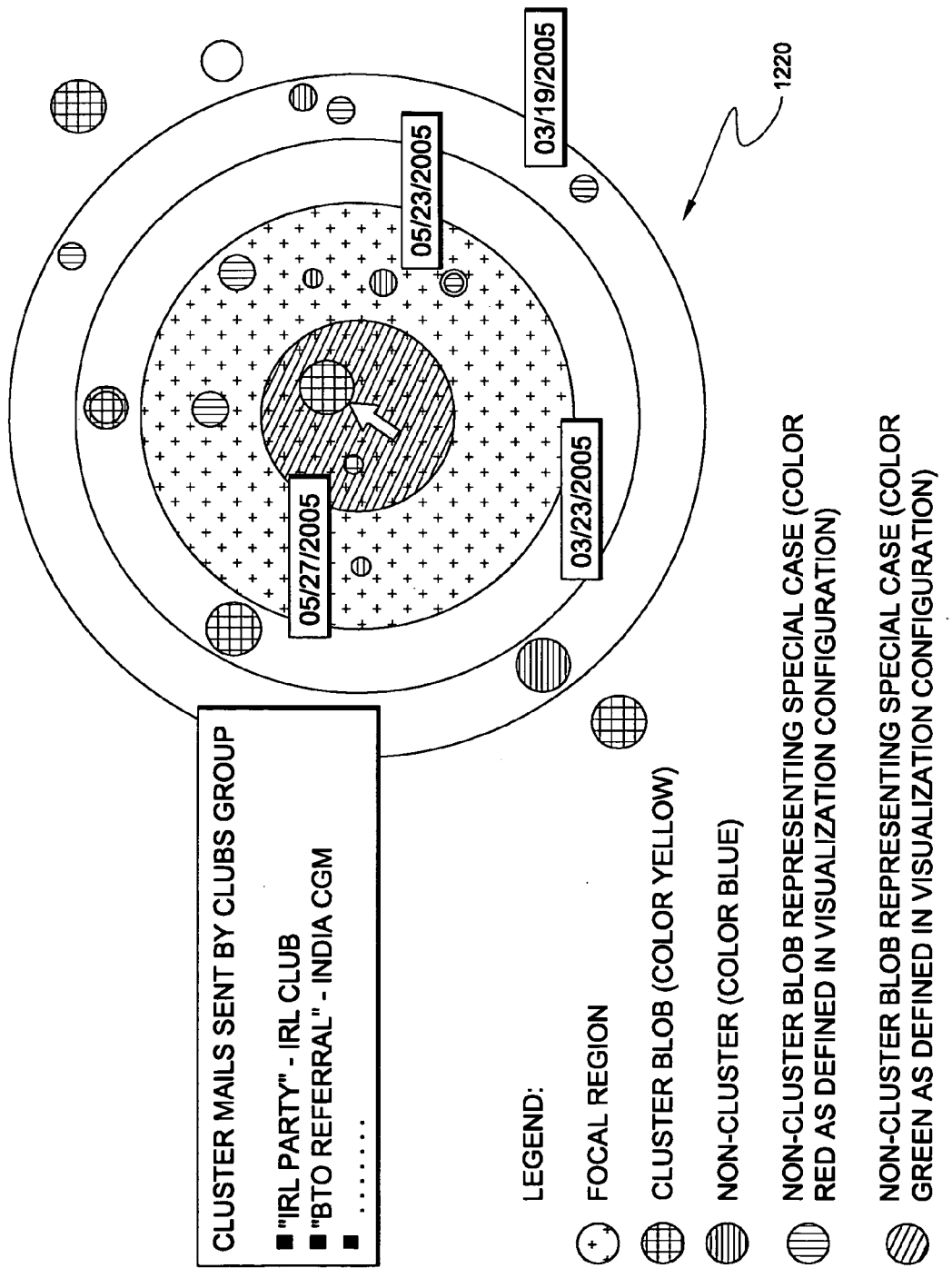
FIG. 12 shows an application of the present invention to email data.

FIG. 12 illustrates an exemplary application of this invention to email data, where reference numeral 1210 is a generic email client and reference numeral 1220 is a visualization generated according to the present invention of the emails stored by the generic email client 1010. Table 3 below shows the configuration parameters used:

TABLE 3

1.

| Visual Indicator | Attribute used |
| --- | --- |
| Focal point - radius | Time. |
| | Multiple focal regions specified |
| Colour | Red - New mail |
| | Blue - Forwarded or replied email |
| Size | Size of message |
| Shape | Circle - Normal |
| | Double circle - Urgent mail |
| Clustering | Based on person (groups) who sent the mail. |

As can be appreciated, the visualization 1220 of the email data generated by this invention provides, at a glance, the date, importance, size, and status (forwarded, replied, new, etc) of all emails.

Figure 13:
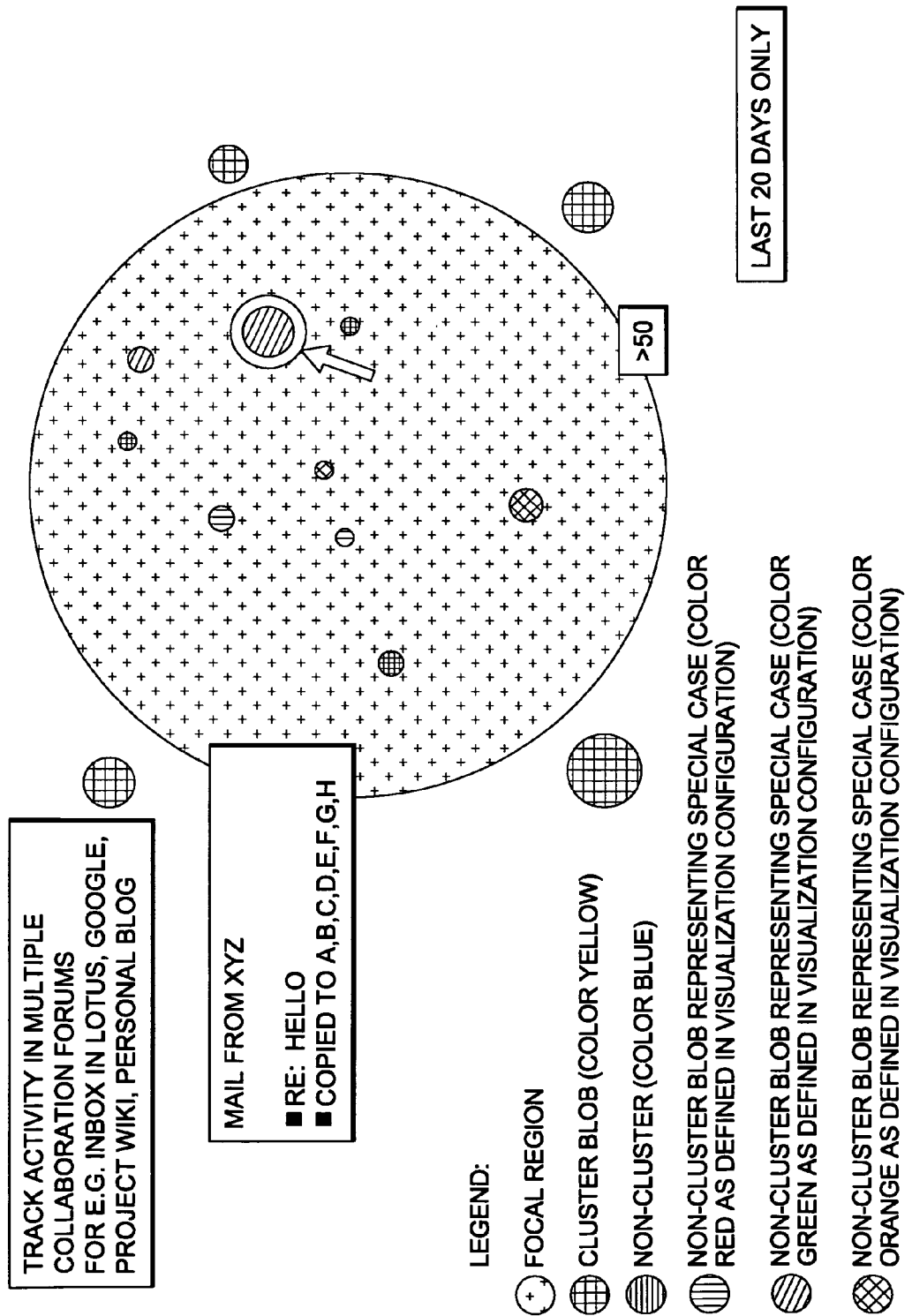
FIG. 13 shows an application of the present invention to a collaboration tracker.
Figure 14:
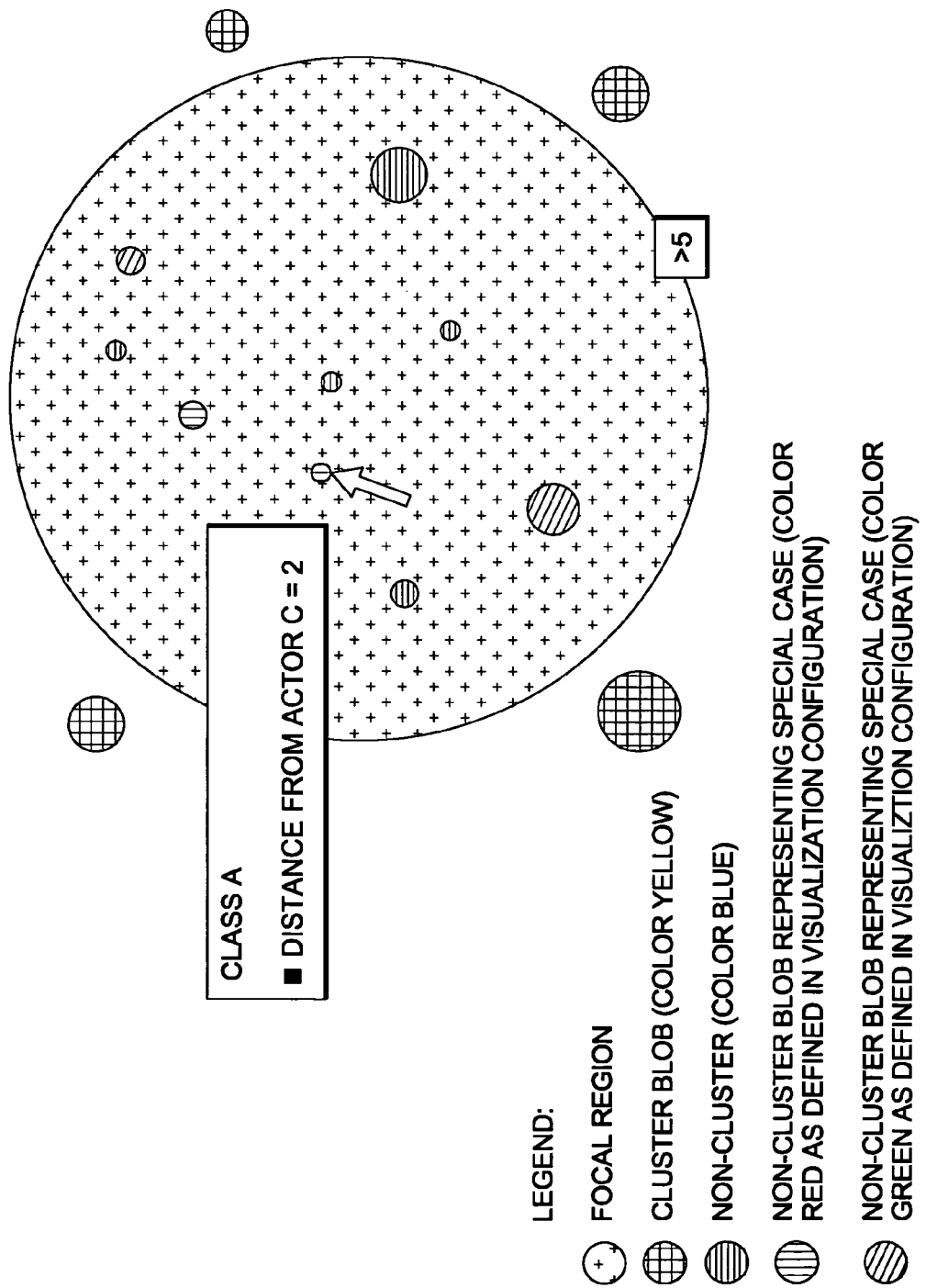
FIG. 14 shows an application of the present invention to the rendering of a graph.

FIG. 13 illustrates an implementation of this invention on a collaboration tracker tracking data from a plurality of collaboration tools such as email, chats, blogs, and the like. Table 4 below shows the configuration parameters used:

TABLE 4

| Visual Indicator | Attribute used |
| --- | --- |
| Focal point - radius | Function for calculating priority based on importance of sender and time sent. |
| Colour | Yellow - Cluster |
| | Blue - Comment on blog |
| | Red - Message in Lotus |
| | Orange - Entry on Wiki |
| | Green - Mail on Google |
| Size | No. of people involved |
| Shape | Circle - Normal |
| | Double circle - New entry |
| Filter | Show only messages in the last 20 days |
| Clustering | Based on forum where conversation is being done |

FIG. 13 illustrates an implementation of this invention applied to the rendering of graphs. In this example a rose model is used as the dataset. Table 5 below shows the configuration parameters used:

TABLE 5

| Visual Indicator | Attribute used |
| --- | --- |
| Focal point - radius | No. of hops from model item of interest |
| Colour | Types of model elements |
| Size | No. of outgoing links |
| Shape | Circle - Normal |
| Clustering | Based on types of model elements - class, use cases |

Other applications of this invention are readily envisioned. The following list provides still more exemplary applications of this invention. It is to be appreciated that the following list is inclusive, and not in anyway intended to limit the scope of this invention.

Activity information on a Wiki—a visualization occupies a portion on the Wiki and keeps track of new pages added, pages modified etc. Clustering can be based on page hierarchy or category assigned to page.

Activity information on Blogs—a visualization is used by the blog creator to keep track of messages received for his different postings. Blog readers can use the visualization to monitor different blogs for additional postings and messages.

Monitoring of activity information on social network sites (e.g. "friendster,")—A visualization is created for an interest area, and members of such interest areas are periodically polled for information regarding their activities. Activities to be visualized include recent postings, and the like. New members can be automatically highlighted, and clustering can be performed based on network branch.

The foregoing describes only some aspects of this invention, and modifications and/or changes can be made thereto without departing from the scope and spirit of the invention, the aspects being illustrative and not restrictive.

We claim:

1. A data visualization device comprising:
a memory configured to store:
a plurality of data input items comprising one of: a single-dimensional data value, a first attribute value corresponding to said single-dimensional value, and a function of said first attribute value; and
a processor configured to:
calculate a focal value of each of said plurality of data input items, wherein said focal value corresponds to one of: a single-dimensional data value, a first attribute value corresponding to said single-dimensional value, and a function of said first attribute value;
categorize each of the plurality of data input items as falling within a range of focal value, selected by a user, that represents a focal region of interest to said user, or as falling outside said focal region,
if a data input item is categorized as falling within said focal region, then representing said data input item as a non-cluster blob, and
if said data input item is categorized as falling outside said focal region, then further categorizing said data input item according to a second attribute value of a second user-selected attribute or function of said second user-selected attribute, and clustering each of said categorized data input items corresponding to said second attribute value for representation as a cluster blob;
arrange said data visualization as a radial display, wherein:
said focal values extend in an order from a center of said radial display to an outermost radial extent of said radial display; and
said focal region of interest comprises a contiguous portion of a radius of said radial display; and
render a size of said cluster blob as proportional to a number of said data items having said second attribute value of said second user-selected attribute or a function of said second user-selected attribute.

2. The data visualization device of claim 1, wherein rendering a size of the focal region is based on characteristics of a presentation device to which the visualization is output.

3. A computer-implemented method of generating a data visualization of a plurality of data input items, the method comprising the:

calculating, by a computer, a focal value of each of said plurality of data input items, wherein said focal value corresponds to one of: a single-dimensional data value, a first attribute value corresponding to said single-dimensional value, and a function of said first attribute value;
categorizing, by said computer, each of the plurality of data input items as falling within a range of focal value, selected by a user, that represents a focal region of interest to said user, or as falling outside said focal region,
if a data input item is categorized as falling within said focal region, then representing said data input item as a non-cluster blob, and
if said data input item is categorized as falling outside said focal region, then further categorizing said data input item according to a second attribute value of a second user-selected attribute or function of said second user-selected attribute, and clustering each of said categorized data input items corresponding to said second attribute value for representation as a cluster blob;
arranging, by said computer, said data visualization as a radial display, wherein:
said focal values extend in an order from a center of said radial display to an outermost radial extent of said radial display; and
said focal region of interest comprises a contiguous portion of a radius of said radial display; and
rendering, by said computer, a size of said cluster blob as proportional to a number of said data items having said second attribute value of said second user-selected attribute or a function of said second user-selected attribute.

4. The method of claim 3, wherein the size of the focal region is calculated based on characteristics of a presentation device to which the visualization is output.

5. A non-transitory computer readable storage medium having a computer program tangibly recorded therein to perform a method for generating a data visualization of a plurality of data input items, said method comprising:
calculating a focal value of each of said plurality of data input items, wherein said focal value corresponds to one of: a single-dimensional data value, a first attribute value corresponding to said single-dimensional value, and a function of said first attribute value;
categorizing each of the plurality of data items inputs falling within a range of focal value, selected by a user, that represents a focal region of interest to said user, or as falling outside said focal region,
if a data input item is categorized as falling within said focal region, then representing said data input item as a non-cluster blob, and
if said data input item is categorized as falling outside said focal region, then further categorizing said data input item according to a second attribute value of a second user-selected attribute or function of said second user-selected attribute, and clustering each of said categorized data input items corresponding to said second attribute value for representation as a cluster blob;
arranging said data visualization as a radial display, wherein:
said focal values extend in an order from a center of said radial display to an outermost radial extent of said radial display; and
said focal region of interest comprises a contiguous portion of a radius of said radial display; and rendering, by said computer, a size of said cluster blob as proportional to a number of said data items having said second attribute value of said second user-selected attribute or a function of said second user-selected attribute.

6. The data visualization device of claim 1, wherein said processor is further configured to render a color of said cluster blob as depending on said data item having a third attribute value of a third user-selected attribute or a function of said third user-selected attribute.

7. The data visualization device of claim 1, wherein said processor is further configured to render a shape of said cluster blob as depending on said data item having a fourth attribute value of a fourth user-selected attribute or a function of said fourth user-selected attribute.

8. The method of claim 3, further comprising rendering, by said computer, a color of said cluster blob as depending on said data item having a third attribute value of a third user-selected attribute or a function of said third user-selected attribute.

9. The method of claim 6, further comprising rendering, by said computer, a shape of said cluster blob as depending on said data item having a fourth attribute value of a fourth user-selected attribute or a function of said fourth user-selected attribute.

* * * * *